April 29, 1941.   E. BREITLING ET AL   2,239,807
CASH REGISTER, ACCOUNTING AND THE LIKE MACHINE
Filed March 22, 1939   22 Sheets-Sheet 1
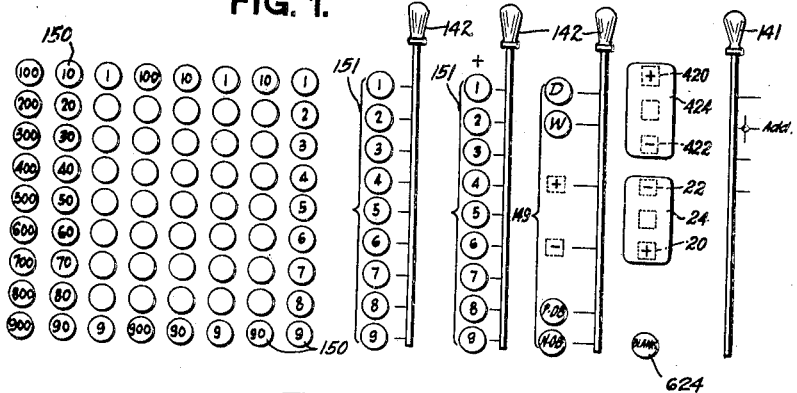
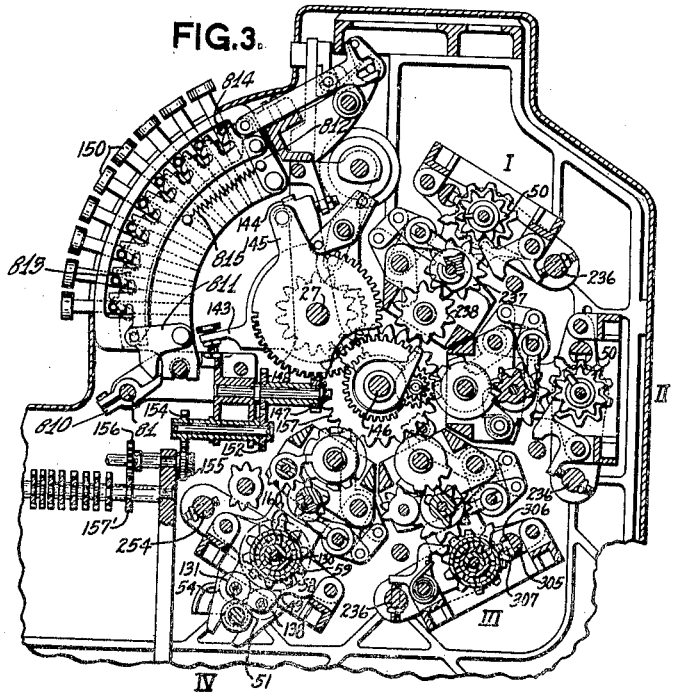
Ernst Breitling
Hans Schwenk
Hans Uhlmann
Inventors
By Carl Benst
Their Attorney April 29, 1941.  E. BREITLING ET AL  2,239,807
CASH REGISTER, ACCOUNTING AND THE LIKE MACHINE
Filed March 22, 1939    22 Sheets-Sheet 2
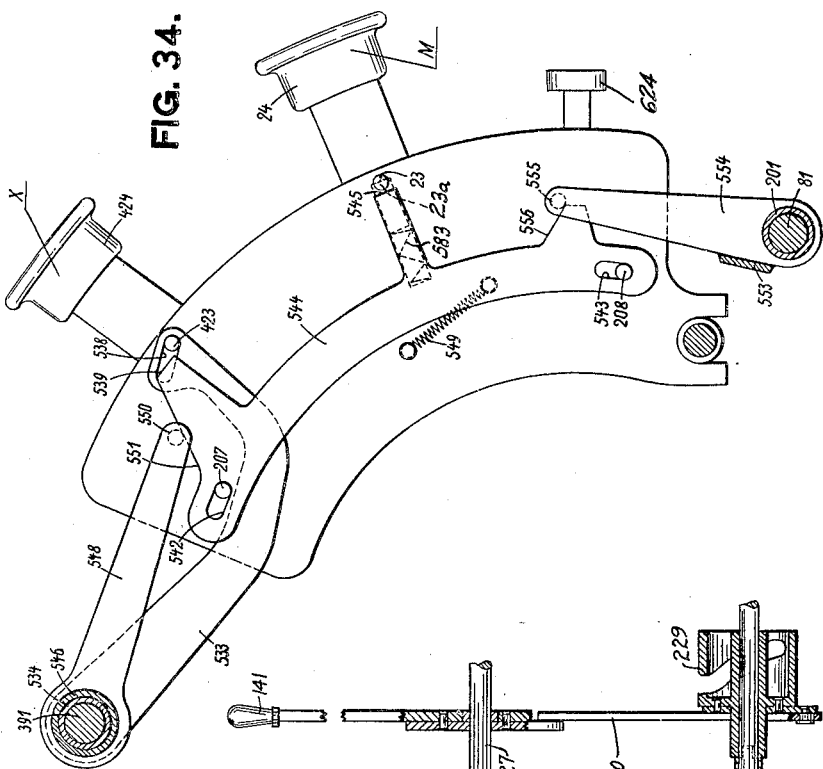
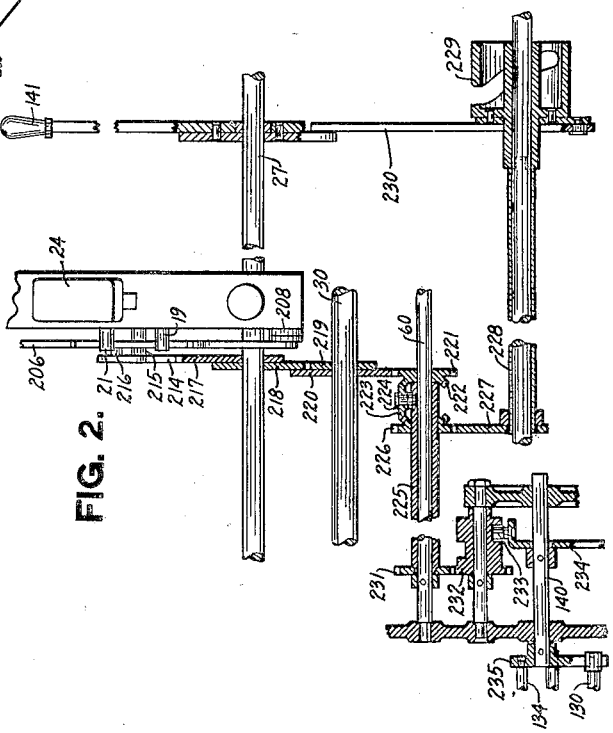
Ernst Breitling
Hans Schwenk
Hans Uhlmann
Inventors
By Carl Beust
Their Attorney April 29, 1941.     E. BREITLING ET AL     2,239,807
CASH REGISTER, ACCOUNTING AND THE LIKE MACHINE
Filed March 22, 1939     22 Sheets-Sheet 3

Ernst Breitling
Hans Schwenk
Hans Uhlmann
Inventors

By *Carl Benst*
Their Attorney

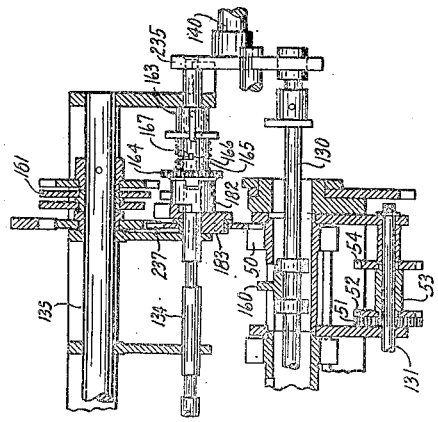
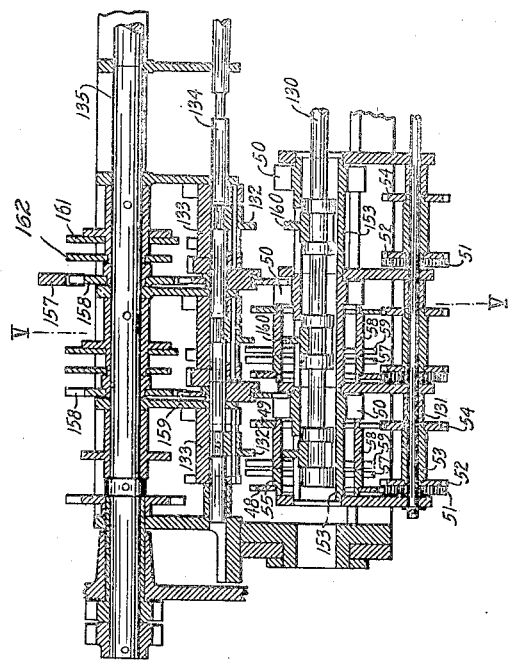

April 29, 1941.  E. BREITLING ET AL  2,239,807
CASH REGISTER, ACCOUNTING AND THE LIKE MACHINE
Filed March 22, 1939  22 Sheets-Sheet 5
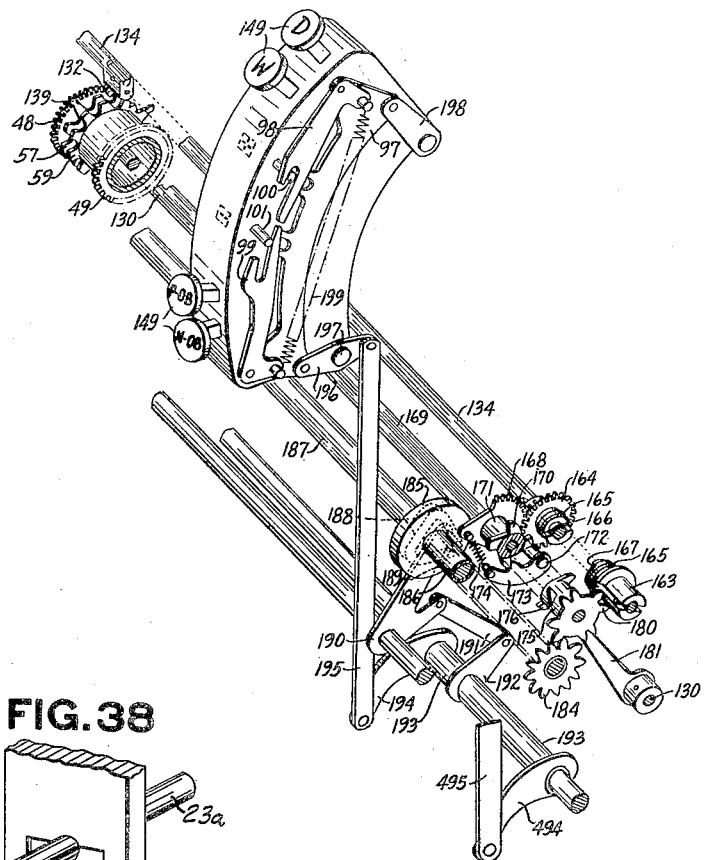
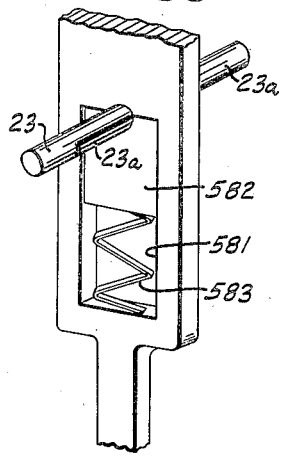
Ernst Breitling
Hans Schwenk
Hans Uhlmann
Inventors
By *Carl Benst*
Their Attorney April 29, 1941.  E. BREITLING ET AL  2,239,807
CASH REGISTER, ACCOUNTING AND THE LIKE MACHINE
Filed March 22, 1939  22 Sheets-Sheet 6
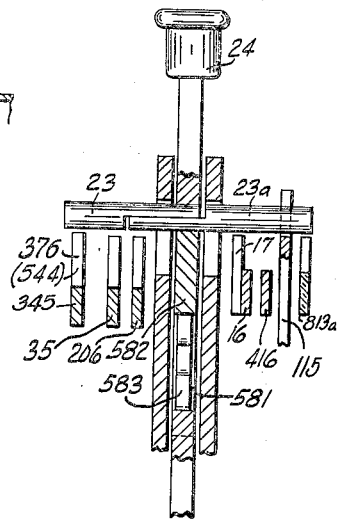
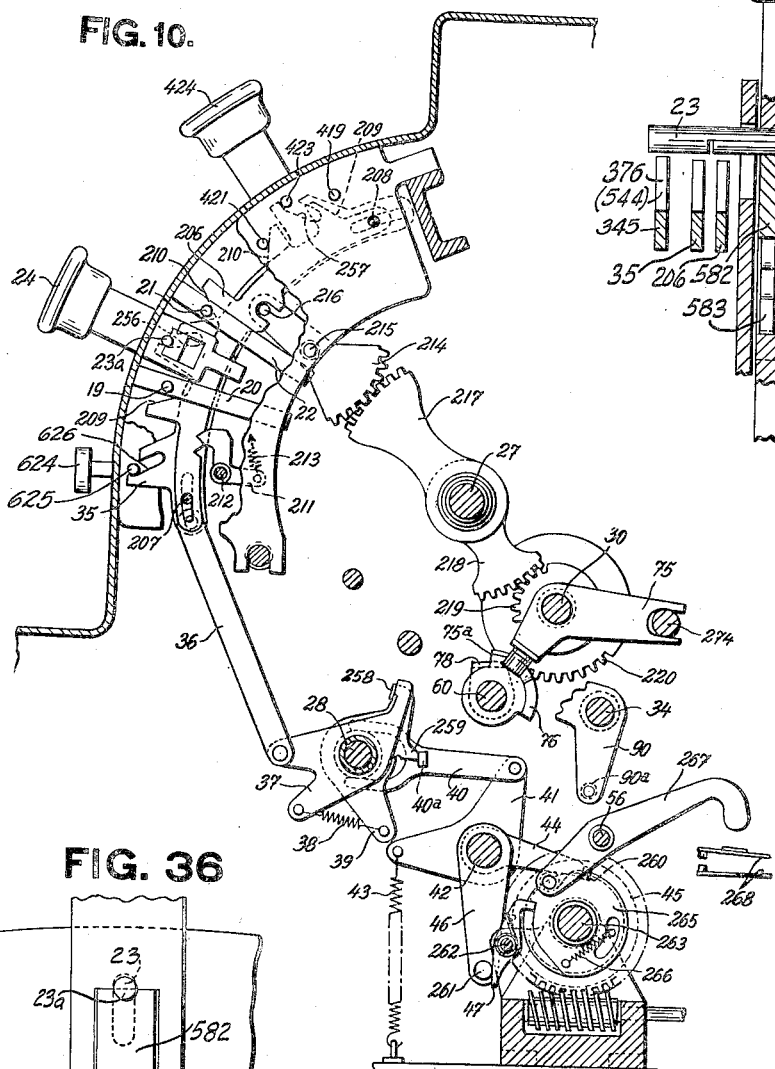
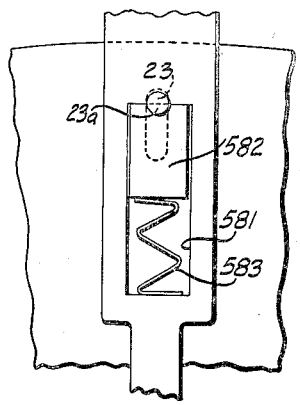
Ernst Breitling
Hans Schwenk
Hans Uhlmann
Inventors
By Carl Benst
Their Attorney

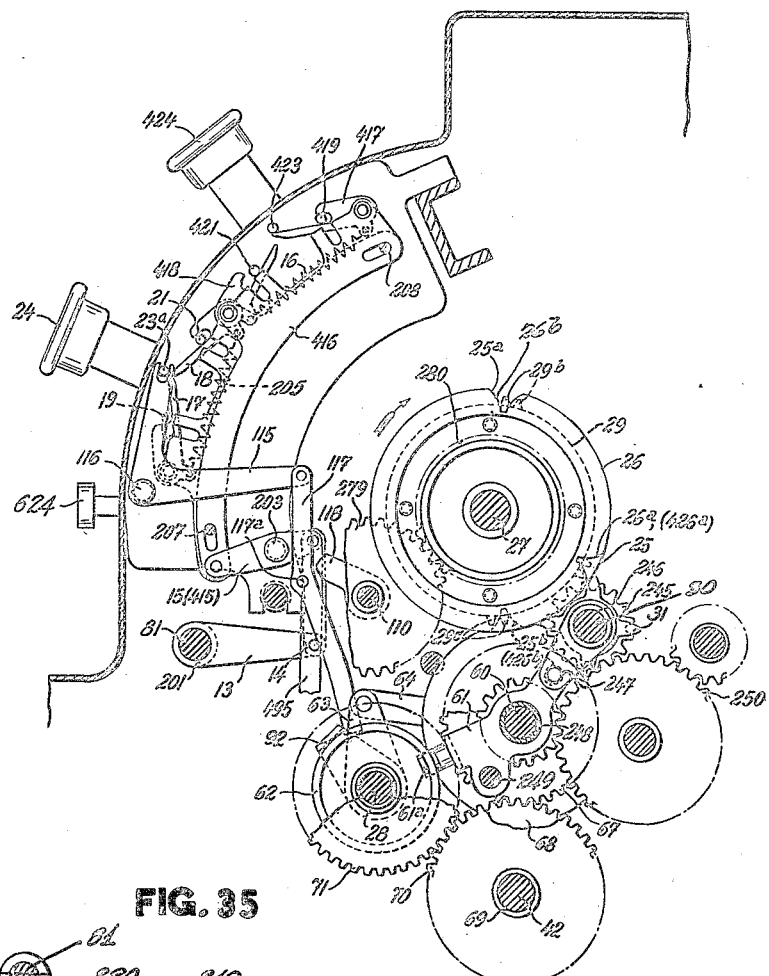

April 29, 1941.    E. BREITLING ET AL    2,239,807
CASH REGISTER, ACCOUNTING AND THE LIKE MACHINE
Filed March 22, 1939    22 Sheets-Sheet 10

Ernst Breitling
Hans Schwenk
Hans Uhlmann
Inventors

By Earl Beust
Their Attorney

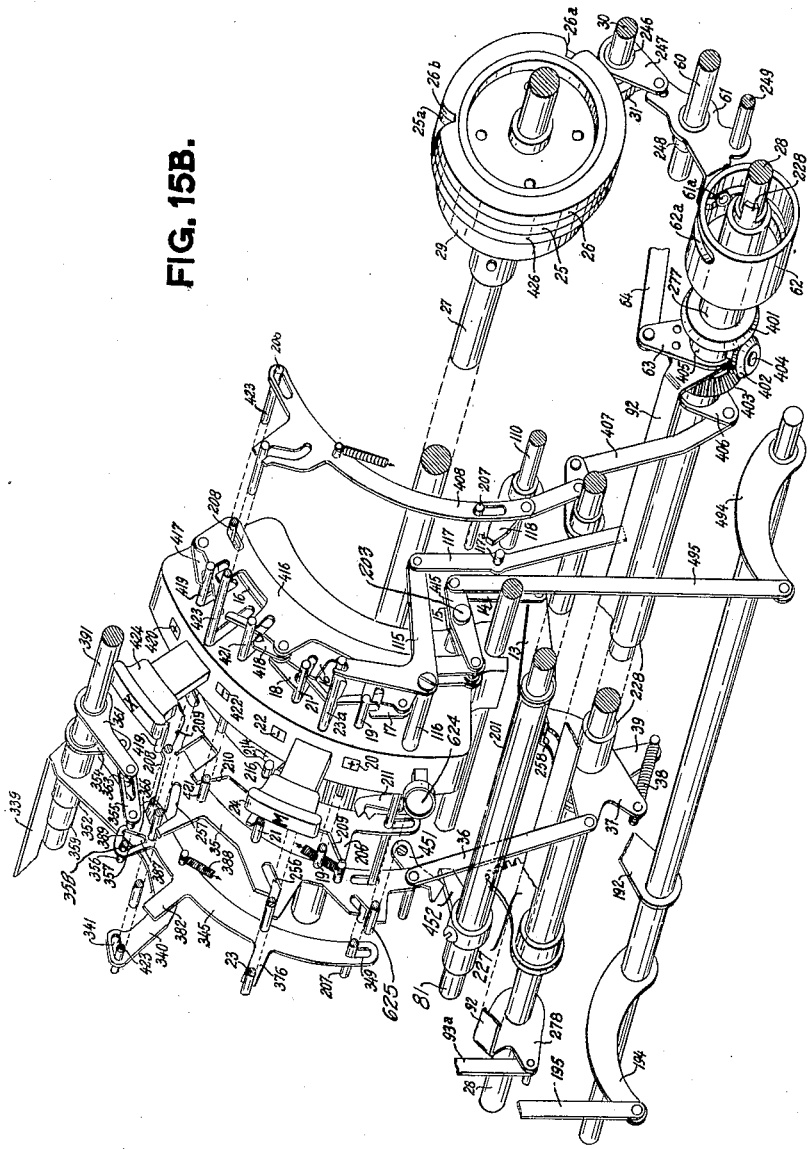

April 29, 1941.   E. BREITLING ET AL   2,239,807
CASH REGISTER, ACCOUNTING AND THE LIKE MACHINE
Filed March 22, 1939   22 Sheets-Sheet 12

Ernst Breitling
Hans Schwenk
Hans Uhlmann
Inventors

By Carl Benst
Their Attorney

April 29, 1941.  E. BREITLING ET AL  2,239,807
CASH REGISTER, ACCOUNTING AND THE LIKE MACHINE
Filed March 22, 1939  22 Sheets-Sheet 13

Ernst Breitling
Hans Schwenk
Hans Uhlmann
Inventors

By Carl Beust
Their Attorney

April 29, 1941. E. BREITLING ET AL 2,239,807
CASH REGISTER, ACCOUNTING AND THE LIKE MACHINE
Filed March 22, 1939 22 Sheets-Sheet 14

Ernst Breitling
Hans Schwenk
Hans Uhlmann
Inventors

By *Earl Benst*
Their Attorney

April 29, 1941. E. BREITLING ET AL 2,239,807
CASH REGISTER, ACCOUNTING AND THE LIKE MACHINE
Filed March 22, 1939 22 Sheets-Sheet 15

Ernst Breitling
Hans Schwenk
Hans Uhlmann
Inventors

By *Carl Beust*
Their Attorney

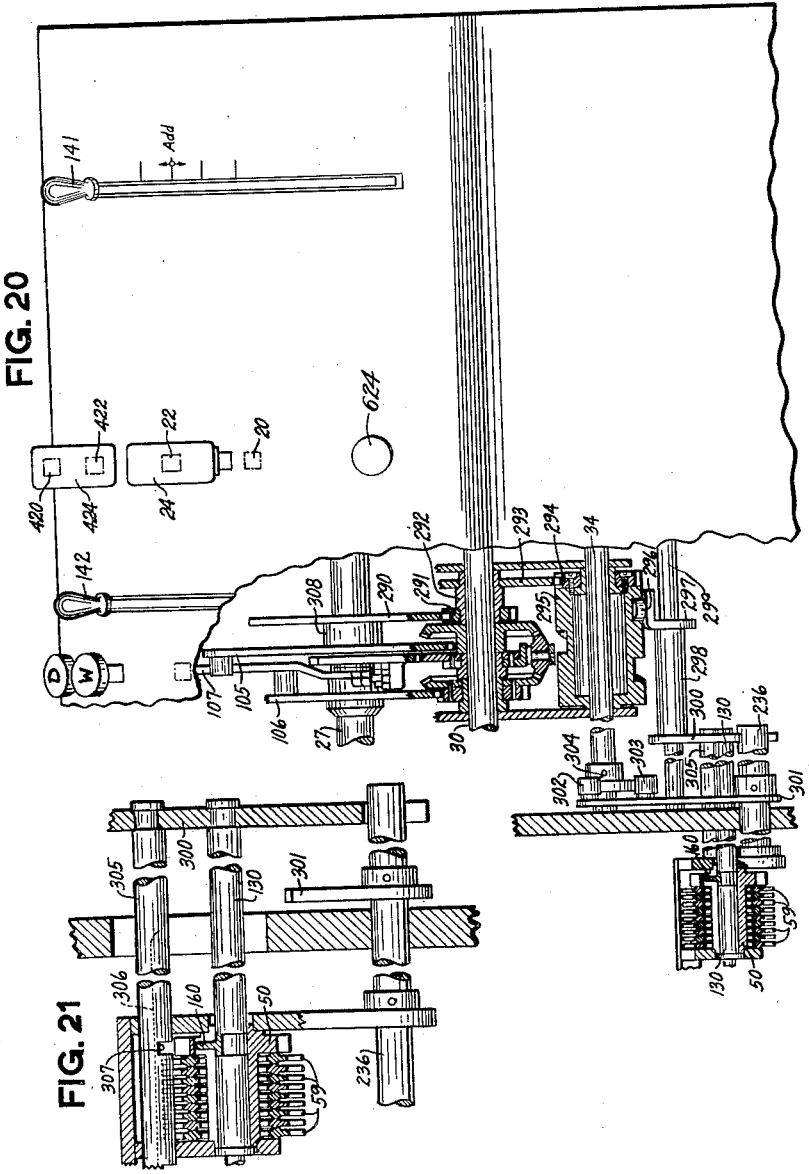

April 29, 1941.     E. BREITLING ET AL     2,239,807
CASH REGISTER, ACCOUNTING AND THE LIKE MACHINE
Filed March 22, 1939     22 Sheets-Sheet 17
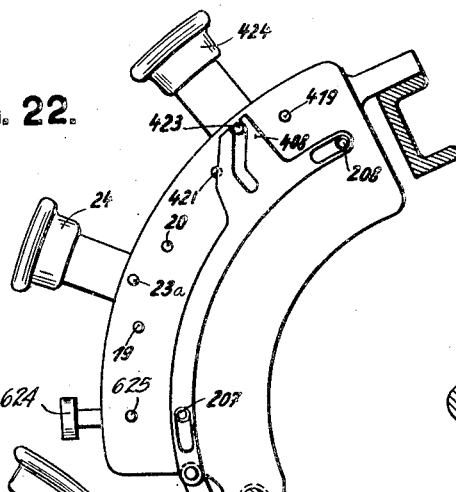
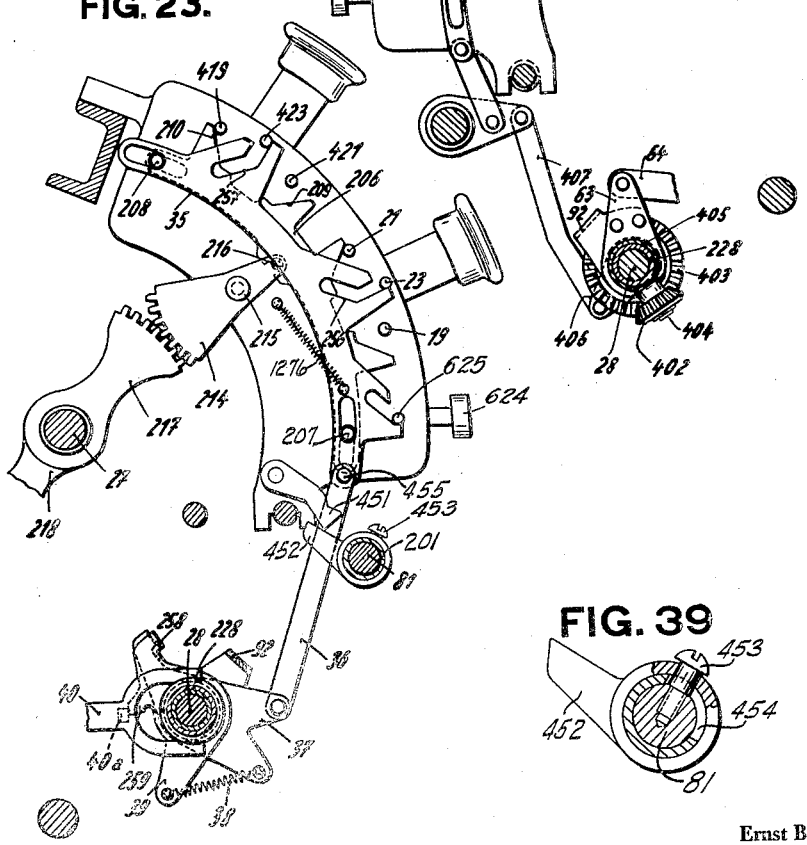
Ernst Breitling
Hans Schwenk
Hans Uhlmann
Inventors
By Carl Bernst
Their Attorney

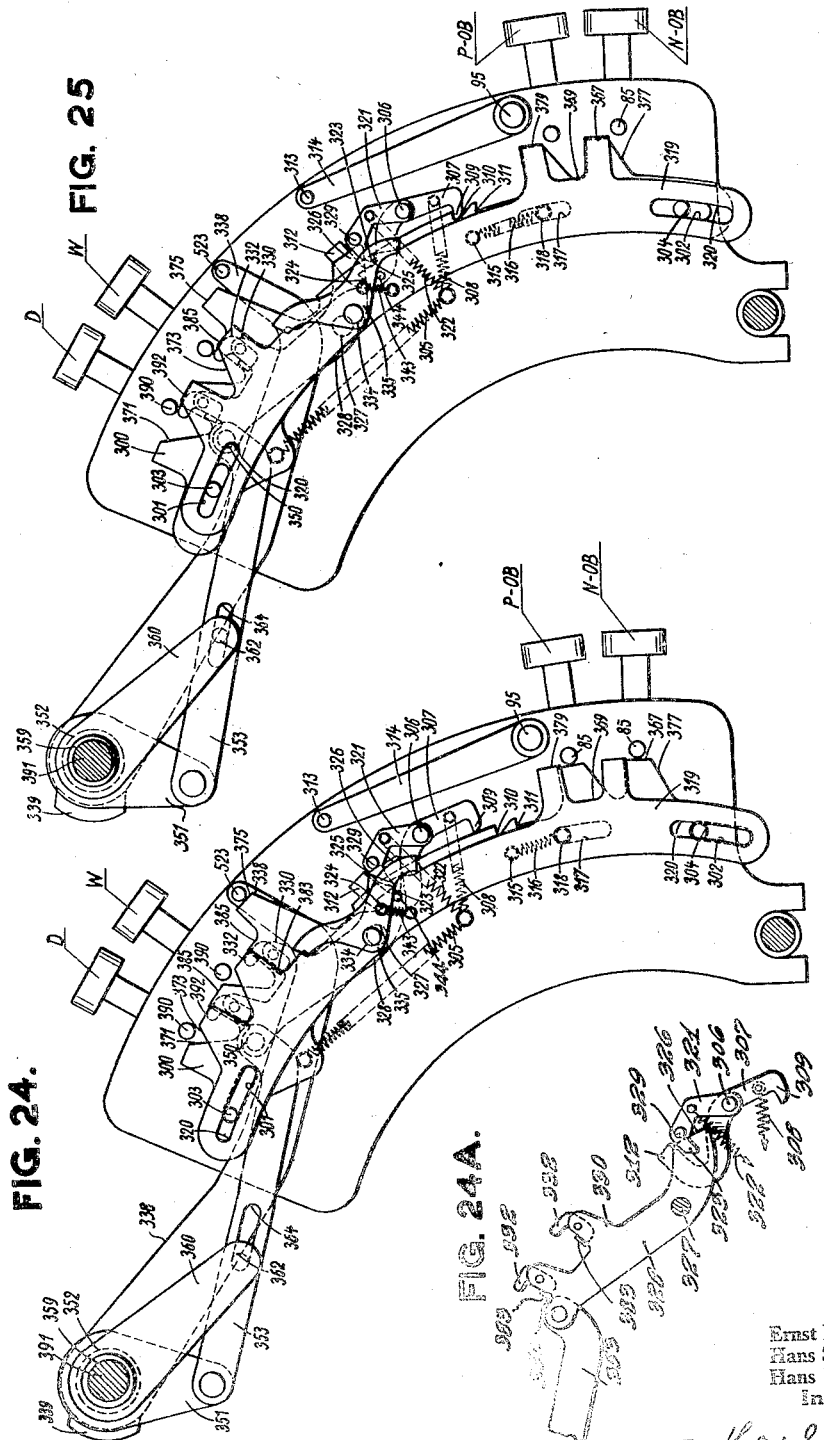

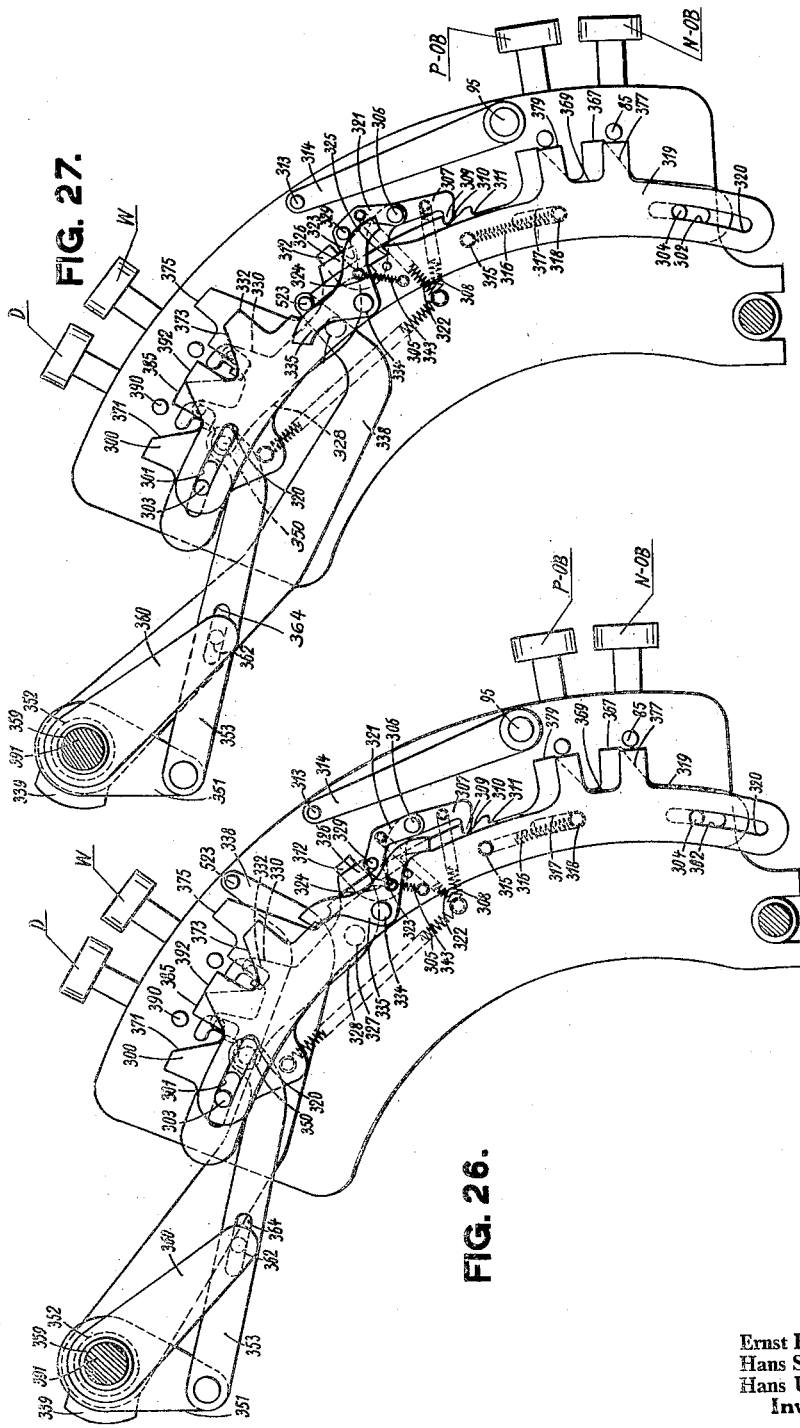

April 29, 1941.  E. BREITLING ET AL  2,239,807
CASH REGISTER, ACCOUNTING AND THE LIKE MACHINE
Filed March 22, 1939  22 Sheets-Sheet 20
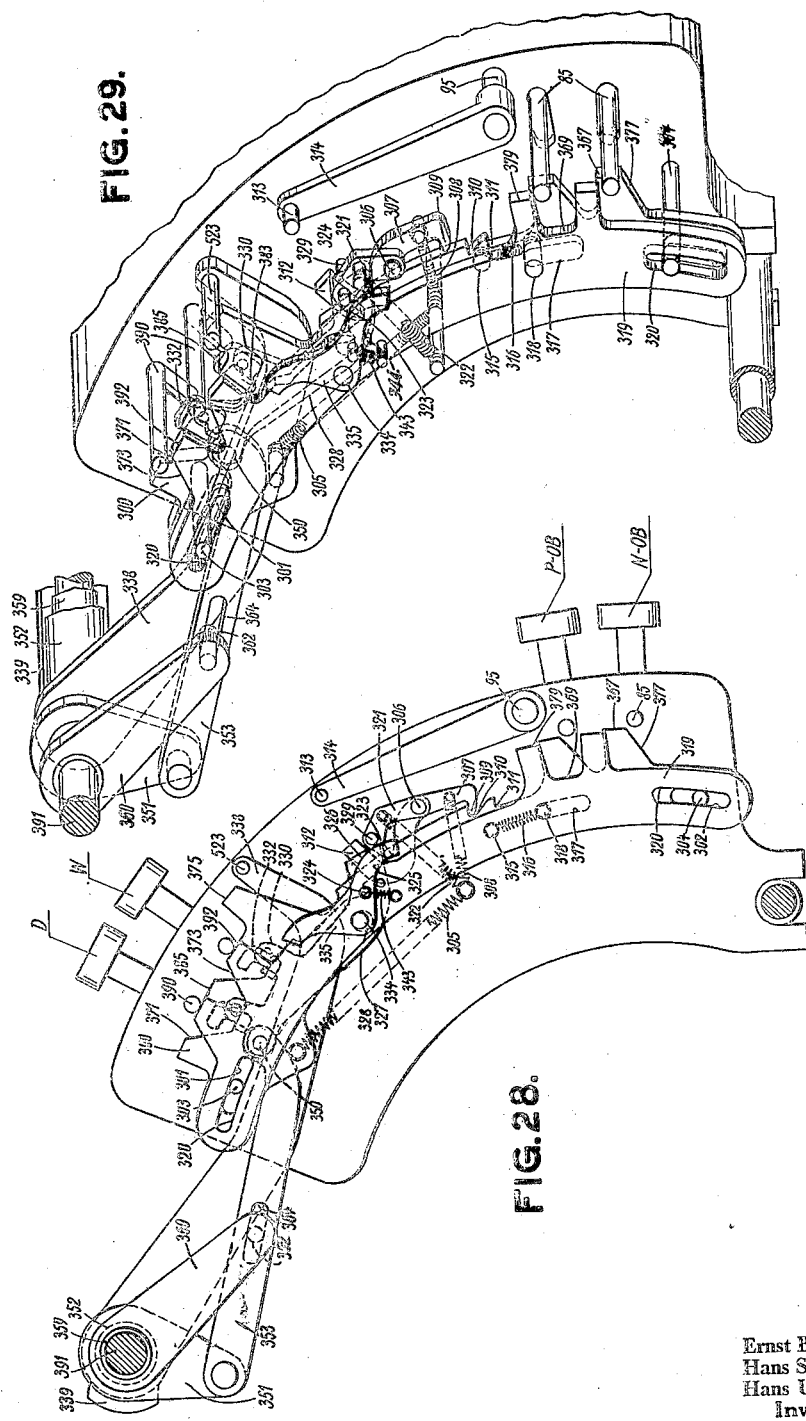
Ernst Breitling
Hans Schwenk
Hans Uhlmann
Inventors
By Earl Beust
Their Attorney April 29, 1941.  E. BREITLING ET AL  2,239,807
CASH REGISTER, ACCOUNTING AND THE LIKE MACHINE
Filed March 22, 1939  22 Sheets-Sheet 21

Ernst Breitling
Hans Schwenk
Hans Uhlmann
Inventors

By Carl Beust
Their Attorney

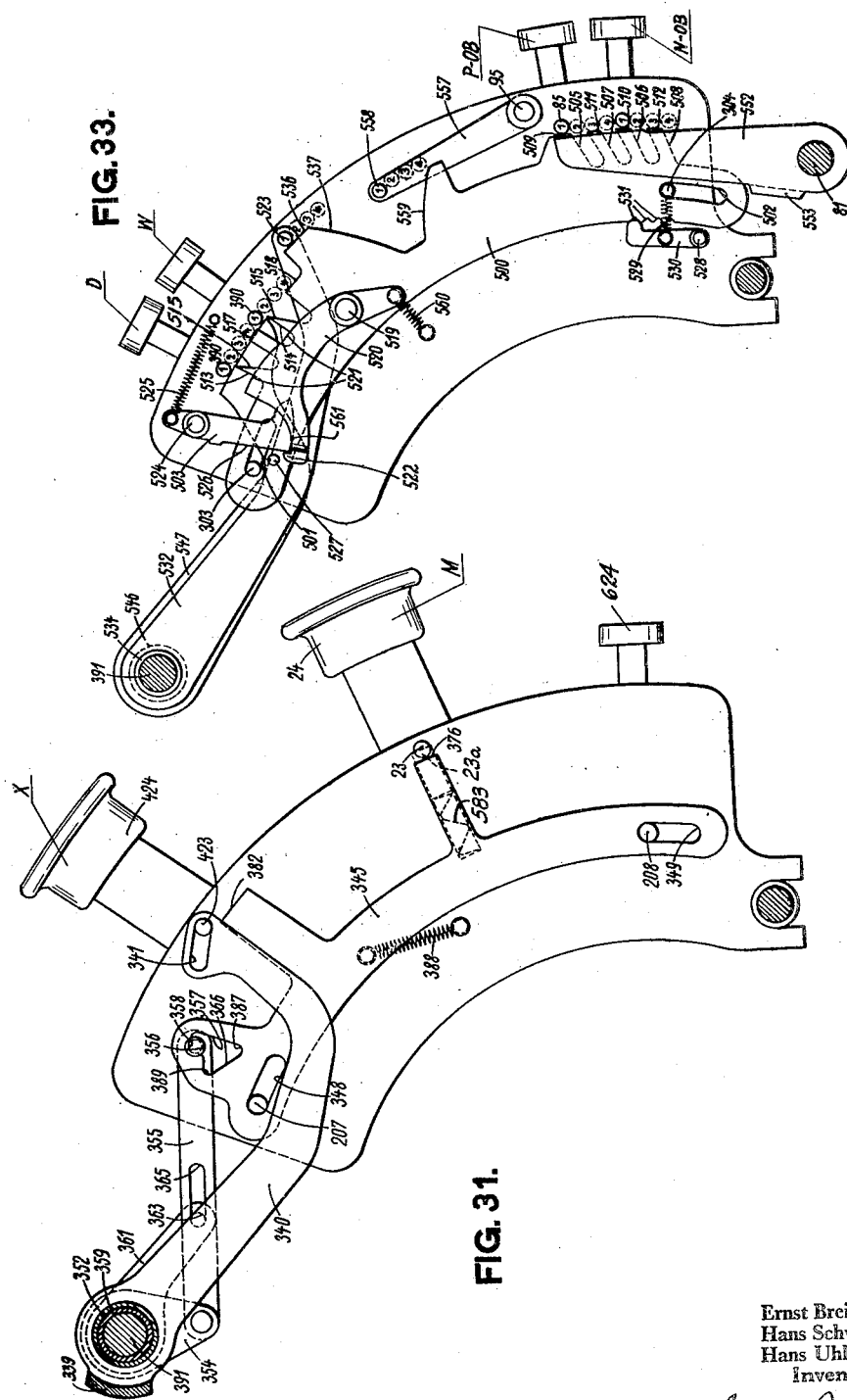

Patented Apr. 29, 1941

2,239,807

UNITED STATES PATENT OFFICE 2,239,807

CASH REGISTER, ACCOUNTING AND THE LIKE MACHINE

Ernst Breitling, Berlin-Tempelhof, Hans Schwenk, Berlin, and Hans Uhlmann, Berlin-Steglitz, Germany, assignors to The National Cash Register Company, Dayton, Ohio, a corporation of Maryland (1926)

Application March 22, 1939, Serial No. 263,370
In Germany January 23, 1936

15 Claims. (Cl. 235—27)

This application is a continuation in part of application, Serial No. 114,624, filed December 7, 1936.

The invention relates to cash registers, accounting, and the like machines, which are provided with an add-subtract, or so called "balance" totalizer, and mechanism for taking and printing a New balance of an account or transaction which comprises an "old balance" and special entries, such as "deposits" and "withdrawals," and more particularly to machines in which the "new balance" of the transaction is automatically taken and printed from the add-subtract totalizer upon entering the last item, i. e., the "old balance" in a continuous machine operation consisting of several cycles, as shown and described in the co-pending application of Neureiter and Schwenk, Serial No. 729,712, filed June 8, 1934, which application issued into Patent No. 2,176,146 on October 17, 1939.

The transactions entered into the machine may include one or more positive and/or negative items, and it is desired that a total of these items be recorded before a balance is taken from the add and subtract totalizer. This result could be obtained by providing two add and subtract totalizers, one for computing the balance of the items themselves, and the other for computing a new balance of the account. However, in the present machine only one add and subtract totalizer is provided to compute both of these results. In order to compute these results, the items are entered into the add and subtract totalizer and a sub-total is taken therefrom. This records the balance of the items themselves. After the sub-total operation is completed, the "old balance" is entered to compute the "new balance," which is then taken from the add and subtract totalizer and recorded on the record media. This requires that the items be entered, the sub-total taken, the old balance entered, and a new balance recorded in a definite sequence.

Thus the main object of the invention is to adapt a single add-subtract totalizer for multiple item total and transaction total taking in a definite sequential performance.

Another object of the invention is to provide means to enforce a subtotal taking machine operation to obtain the balance of a multiple of items of a single transaction, comprising such multiple items, before an old balance can be entered to obtain a new balance.

Another object of the invention is to provide for selecting the proper side of the add-subtract totalizer in amount-entering and total-taking operations.

Another object of the invention is to provide means for preventing a total-taking operation after the first single item entering machine operation.

Another object of the invention is to provide means for controlling a predetermined sequence of the various machine operations appertaining to one single transaction including the transaction total taking.

Another object of the invention is to provide means for enforcing the item or multiple item entering at the beginning of the transaction.

Another object of the invention is to provide means for enforcing the entry of any special amount necessary for taking the total of the whole transaction after a multiple item total taking operation.

Still another object of the invention is to provide for an automatic transaction total taking operation subsequent to the last entering operation of a transaction.

With these and incidental objects in view, the invention includes certain novel features of construction and combination of parts, the essential elements of which are set forth in the appended claims and a preferred form or embodiment of which is hereinafter described with reference to the drawings which accompany and form a part of this specification.

Of said drawings:

Fig. 1 shows the keyboard of the machine.

Fig. 2 is a longitudinal section through the device for shifting the balance totalizer into the adding or subtracting position.

Fig. 3 is a cross section through the amount differential device of the machine.

Fig. 4 shows the connection with the amount differential device, and Fig. 5 shows parts of the tens carrying device.

Figs. 8A and 8B are longitudinal sections through the balance totalizer and show its connection with the overdraft device.

Fig. 9 is a perspective view of the overdraft device and its connection with the balance totalizer and the transaction key bank.

Fig. 10 is a side view of the motor key bank, and shows the connection with the balance totalizer and the motor clutch for the release of the machine.

Fig. 11 is a side view of the motor key bank, and shows the connection with parts of the device for automatically taking the new balance.

Fig. 15B is a perspective of the motor key bank and mechanisms associated therewith.

Figs. 17 and 18 showing different parts thereof in section.

Fig. 20 is a front view with the cabinet partly removed, showing parts of the totalizer selecting device.

Fig. 21 is a longitudinal section through parts of Fig. 20.

Fig. 22 is a side view of the motor key bank as viewed from the right, showing parts of the mechanism for changing the mode of operation of the balance totalizer.

Fig. 23 is a side view of the motor key bank as viewed from the left, showing the releasing device of the machine.

Fig. 24 is a side view of the transaction key bank viewed from the left, with the key locking device normally positioned.

Fig. 24A is a detail of some of the parts shown in Fig. 24.

Figs. 25 to 28 show the same mechanisms in different positions, viz, Fig. 25 after only a single transaction has been entered, Fig. 26 after more transactions have been entered, Fig. 27 after a sub-total has been taken, and Fig. 28 while the old balance is set up.

Figs. 29 and 30 are perspective views of the locking device.

Fig. 31 is a side view of the motor key bank with the appropriate locking mechanism.

Fig. 33 is a side view of the transaction key bank with a modified locking device.

Fig. 34 is a side view of the motor key bank with the modified locking device.

Fig. 35 is a detail view of the mechanism for rocking the key release shaft.

Figs. 36, 37 and 38 are detail views showing the motor release key.

Fig. 39 is a detail of part of the motor key release mechanism.

General description

Figure 4:
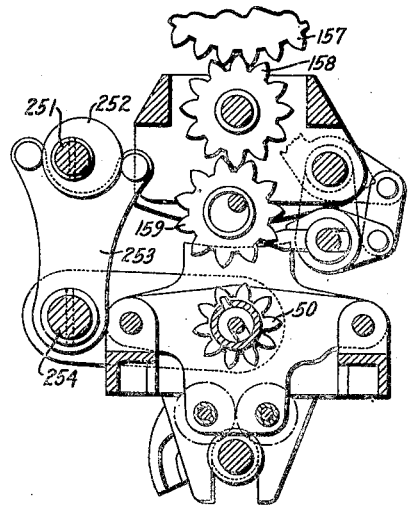
Figs. 4 and 5 are cross sections through the balance totalizer.
Figure 6:
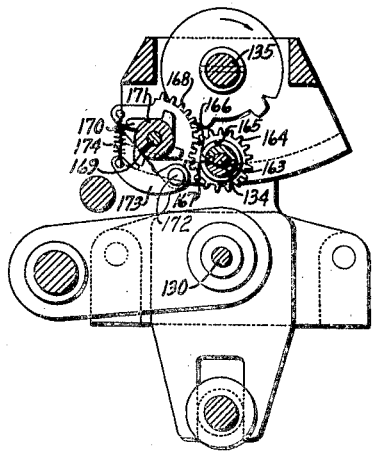
Figs. 6 and 7 are cross sections through the balance totalizer showing parts of the overdraft device.

The present embodiment of the invention provides a machine having one adding and subtracting, or balance, totalizer of a customary type embodying reversely rotatable wheels. There is also provided a row of adding totalizers to accumulate separately the deposits, withdrawals, positive old balances, negative old balances, positive new balances, and negative new balances, and there are further provided two rows of special totalizers for additional classifications of any required nature.

When a deposit or withdrawal is to be entered, the proper transaction key "D" or "W" is depressed, and the machine operated by depression of a motor bar. This enters the amount on the proper side of the balance totalizer, and enters it in the special totalizer assigned to the transaction key depressed. If only a single-item transaction is to be posted, the "Old balance" may be entered immediately after the item is entered. If, however, a multiple-item transaction is to be entered, the sub-total of the multiple items is taken from the balance totalizer before the "Old balance" is entered therein. Due to certain locking devices with which the machine is equipped, the taking of the sub-total is possible only upon depressing a special motor key, which causes the total standing on the balance totalizer to be read. Thereupon, as is the case in connection with entries comprising only a single-item transaction, the "Old balance" of the customer is set up on the keyboard and the machine is controlled by depressing the respective transaction keys P—OB or N—OB according to the algebraic character of the old balance. Upon depression of the motor bar the machine is released for entering the amount set up on the keyboard into the proper side of the balance totalizer, and into the transaction totalizer for the particular transaction key depressed.

Depression of one of these old balance transaction keys also causes the positioning of certain parts in the machine to cause the taking of a new balance during an additional cycle of the machine, automatically following the entry of the old balance. During the taking of the new balance, the overdraft mechanism for the balance totalizer automatically causes the proper side of the balance totalizer to be aligned with the differential actuators, and causes the proper new balance transaction key to be depressed to accumulate this new balance in the proper new balance transaction totalizer.

At the end of this second cycle of a balancing operation, the machine is automatically brought to rest with the parts in position for entering deposits and withdrawals for the next account.

Detailed description—keyboard

The keyboard for the present machine is shown diagrammatically in Fig. 1, and includes amount keys 150, two rows of special totalizer keys 151, and a row of transaction keys 149 bearing appropriate legends. In this transaction bank the keys "D" and "W" represent deposits and withdrawals respectively, and the keys P—OB and N—OB represent positive old balances and negative old balances respectively. The two blind keys "+" and "—" situated near the center of this bank represent the positive and negative new balances respectively. A motor key 24 is situated to the right of the transaction bank and cooperates with two blind keys 20 and 22 used to shift the operating mechanism for the balance totalizer so that amounts may be entered thereon algebraically. In the same bank there is provided a second motor key 424 serving as a means for taking the sub-total from the balance totalizer, and this key cooperates with two blind keys 420 and 422 also selecting the plus or minus side of the balance totalizer.

A motor key 624 is located below the motor key 24 to release the machine for idle operations.

A "kind of operation" lever 141 is provided to take the totals from the various totalizers in the transaction bank, and in the two banks of special totalizer keys. Three totalizer coupling levers 142 are also provided in these banks for use in taking totals. The function of these levers is to select a particular totalizer when it is desired that the total be taken therefrom. The present invention, however, is not concerned with the details of the taking of totals from any of the totalizers in these three rows, and therefore, the operation of these levers is not given. The special totalizer keys 151 in the two left-hand rows control only their respective totalizers, while the transaction keys in the right-hand row control not only the respective totalizer assigned to each, but further control the operation of the balance totalizer.

It must be remembered that the "kind of operation" lever 141 is used in taking totals from the totalizers for the three rows of totalizer selecting keys, but is not used when a sub-total or a total (new balance) is taken from the balance totalizer, for such operations are performed with the lever 141 in its "Add" position.

Differential mechanism

Figure 14:
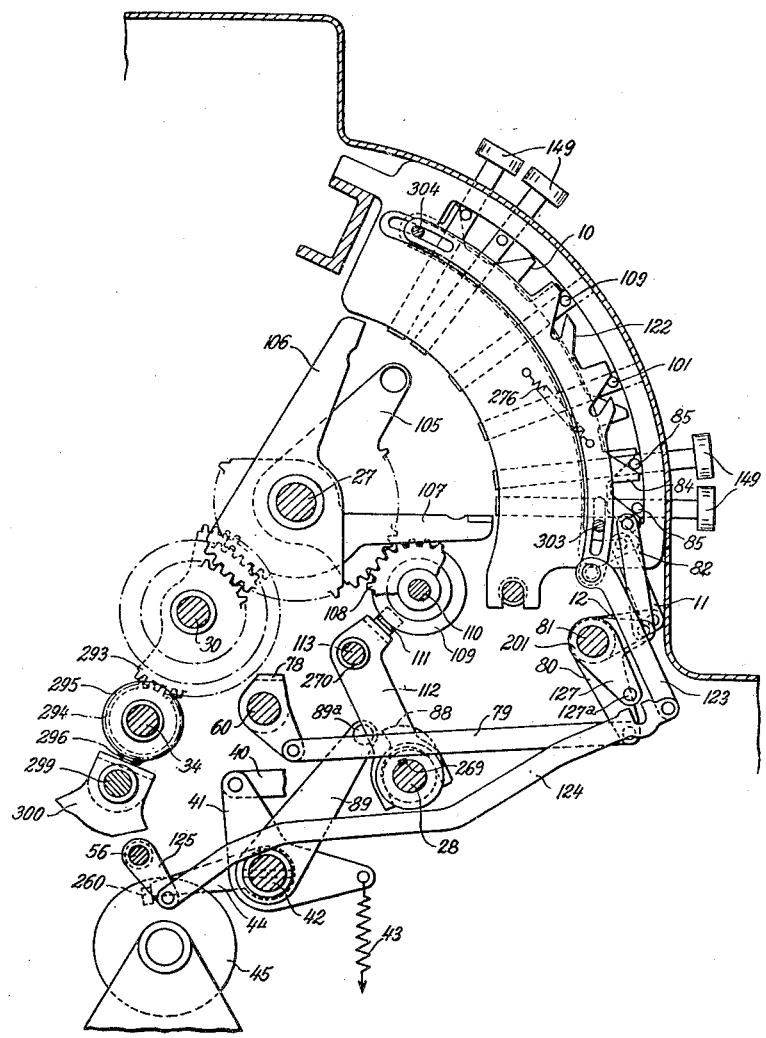
Fig. 14 is a side view from the left of the transaction key bank showing other interconnections between the keys of this bank and the mechanism for automatically taking the new balance.

The differential mechanisms are shown in a general way in Figs. 3 and 14, Fig. 3 showing the amount differential. Referring to Fig. 3, the differential includes two complementarily movable arms 143 and 144 brought together through the action of planetary gears to adjust a minimum movement segment 145 under the inner end of a depressed amount key 150. These parts are actuated by a suitable pinion secured to a shaft 146 oscillated during each operation of the machine. The detailed movement of these parts is not given since they are well known and fully shown and described in prior United States Patent No. 1,792,569, of February 17, 1931, to Ernst Breitling. It might be noted, however, that the particular form of planet gearing shown in Fig. 3 is not present in the patent, but is shown in a later patent disclosing the mechanism for taking totals in this type of machine. This latter patent is the United States Patent No. 1,899,455, of February 28, 1933, to Ernst Breitling. For an understanding of the present case it is sufficient to say that the movement of the complementarily movable members 143 and 144 causes a movement of a large gear 157 to an extent commensurate with the value of the depressed amount key 150. The positioning of the minimum movement segment 145 causes a positioning of its corresponding amount type wheel through a train of gears 147, 148, 152, 154, 155 and 156, and the rack 157', the gear 147 being driven by the segment 145, through bevelled teeth formed on both members.

The differential mechanism for the transaction banks is partially shown in Fig. 14, and includes complementarily movable members 106 and 107, and a minimum movement segment 105. As is customary in the art, the differential mechanisms for these banks control the relative positioning of the various totalizers and the actuating mechanism, so that an amount set up on the keyboard will be entered in the appropriate totalizer under control of the totalizer selecting keys. However, since the details of this selecting mechanism are not necessary to an understanding of the present invention, they are not shown.

Totalizers

The machine on which the present invention is shown includes three rows of interspersed totalizers (Fig. 3) situated radially about the central shaft 146. For identification these rows are numbered I, II, and III. Each of these rows customarily contains nine totalizers. In the present instance two of the rows contain nine totalizers assigned to the two rows of special totalizer keys, and the third row contains six totalizers assigned to the transaction keys. The construction of these interspersed totalizer units and the operation thereof is generally well known in the art, and a form corresponding very closely to that used in the present mechanism is shown and described in United States Patent No. 1,896,936, of February 7, 1933, to Bornkessel et al. The details of this mechanism, however, are not necessary to an understanding of the present invention, so they are not shown.

There is also provided a balance totalizer consisting of only one totalizer unit, but having two reversely rotating wheels in each decimal order. This totalizer unit is numbered IV in Fig. 3, and is better shown in Figs. 4, 5, 8A and 8B. It includes two reversely actuated wheels 57 and 59 (Fig. 8A), a pair of which is provided for each decimal order. The operation of these wheels is briefly as follows:

The differential rotation of large gear 157 (Figs. 3 and 4), commensurate with the value of the numeral key depressed in that particular decimal order, is transmitted directly to pinion 158 (Fig. 4), and from there to pinion 159. Since, at the time of this operation, pinion 50 is engaged with pinion 159, the motion will be transmitted to the former and to a sleeve 153 (Fig. 8A) secured to this pinion. A rider 160 is loosely mounted on a shaft 130, and is slidable longitudinally of the sleeve 153 as clearly shown in this figure. The rider has an upwardly extending prong protruding through a longitudinal slot in the sleeve 153, and is adapted to be moved longitudinally into the plane of either of the totalizer wheels 57 or 59 by longitudinal movement of shaft 130. When the rider is so moved, it is in a position (see Fig. 5) to rotate one of the totalizer wheels upon rotation of the pinion 50 and the sleeve 153.

The reverse rotation of wheels 57 and 59 is made possible by a gear 51 on a shaft 138 (Fig. 5), and gears 52 and 54 (Fig. 8A) connected by a sleeve 53. When a rotation is imparted to the wheel 59, the movement is transmitted through a sleeve 58 and a gear wheel 49 to the wheel 54, sleeve 53, gear 52 and then to gear 51. Rotation of the gear 51 causes rotation of a gear 48 attached to a sleeve 55 on which the totalizer wheel 57 is mounted. It will be noted that gear 51 is sufficiently broad to mesh with gear 52 and also with gear 48.

Figure 5:
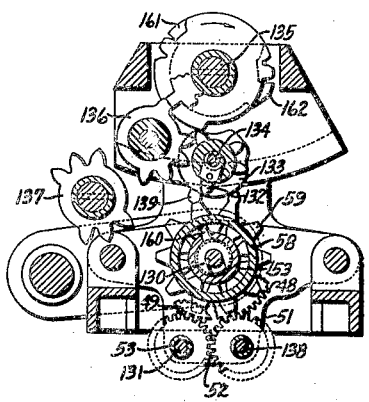
Figure 7:
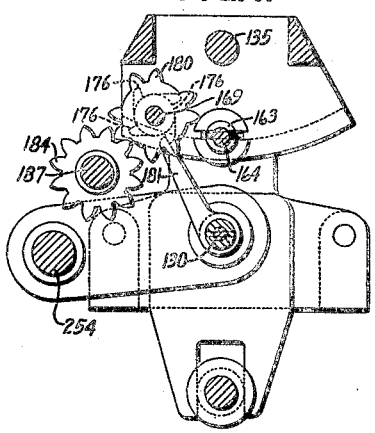

Each of the totalizer wheels 57 and 59 carries a tooth 139 (Fig. 5), sufficiently long to strike a finger 132 depending from an assembly of parts 133 appearing directly over the totalizer wheels in Figs. 5 and 8A. The long tooth of an actuated totalizer wheel displaces its finger 132 whenever it is moved through zero. This movement of the fingers 132 is for the purpose of transferring units from one order to another, and is assisted in this action by disks 161 and 162, and the mutilated gears 136 and 137 appearing in Fig. 5. However, since the details of this mechanism are not necessary to an understanding of the present invention they are not given.

It will be noted, however, that the finger 132 (Fig. 8A), cooperating with the totalizer wheels 57 and 59 of the highest decimal order, is pinned to the shaft 134 so as to impart a slight rotation thereto whenever the wheels of highest order pass through zero.

Overdraft mechanism

The machine in which the present invention is embodied, includes a device commonly known as an automatic overdraft mechanism. This mechanism causes the totalizer to add a unit in the lowest decimal order whenever the totalizer wheels of highest order pass from zero to nine during an overdraft operation, or from nine to zero during an operation when the total passes from negative to a positive condition, to correct the inaccuracy appearing in totalizers of this type whenever the highest order wheel is carried through zero under said condition.

The mechanism also includes the additional feature of allowing this additional, or fugitive, unit to be added in the units order, only when an actual overdraft occurs, and not when the totalizer passes from nine to zero by exceeding its capacity in a positive direction, or by passing from zero to nine after having been overdrafted during a previous operation.

This mechanism is illustrated in Figs. 6, 7, 8 and 9. Referring to Fig. 9, it is seen that whenever either of the totalizer wheels 57 or 59 in the highest decimal order passes through zero, it strikes the finger 132 pinned to the shaft 134, and imparts to this shaft a counter-clockwise rotation. A sleeve member 163 is situated on the right-hand end of shaft 134, and is connected thereto by a pin and slot connection (see also Fig. 8B). This allows the shaft 134 to be shifted axially without a corresponding movement of the sleeve 163, but causes the sleeve to receive whatever rotation is imparted to the shaft. This sleeve is connected to a gear 164 by a spring 165, the spring being secured to both of these members, and sufficiently strong that a partial rotation of sleeve 163 will be imparted bodily to gear 164 if the latter is free to rotate. The gear 164 is loosely mounted on shaft 134 and has a shoulder 166 lying in the vertical plane of a shoulder 167 on the sleeve 163. As shown clearly in Figs. 6 and 8B, these two shoulders normally lie some distance apart. With this construction, when the finger 132 (Fig. 9) is given a rotation by one of the totalizer wheels 57 or 59, a corresponding rotation is imparted to the sleeve 163, which, through spring 165, will rotate gear 164, if the same is not positively held against rotation. If it is so held, the spring 165 will be tensioned and upon passage of the long tooth 139 out of the path of the finger 132, the shaft 134 will spring back to its original position, relaxing the tension in the spring. A segment 168 (Figs. 6 and 9) is loosely mounted on a shaft 169 and carries a stud 172 having pivoted thereon a dog 173. A sleeve member 171 is also loosely mounted on shaft 169 and carries a four tooth restraining wheel 170, four radial teeth 176, and a mutilated gear 180. The four tooth restraining wheel 170 lies in the vertical plane of the dog 173, which dog is constantly held against the wheel by the tension of a spring 174 secured to the dog and to a projection on the left side of the segment. The four teeth 176 are disposed around the sleeve 175 equidistantly and lie in two different planes. As shown in Fig. 9, these teeth lie alternately in the two planes. An arm 181 is secured to shaft 130 (Figs. 7 and 9) and lies in the plane of two of the teeth 176, when the balance totalizer is set for addition, and in the plane of the other two teeth when the totalizer is set for subtraction. The operation of these parts is briefly as follows:

When an overdraft occurs in the register, the shaft 134 is rotated counter-clockwise, causing a counter-clockwise rotation of gear 164 and a clockwise rotation of segment 168, as well as the wheel 170, teeth 176, and gear 180 through the operation of dog 173 by the gear 168. If the balance totalizer was in a positive condition at the beginning of this operation, the arm 181 will be lying out of the plane of the tooth 176 situated closest to it at this time. Therefore, the segment 168 will be free to rotate, upon rotation of the shaft 134. This causes a rotation of the sleeve 182 (Fig. 8B) as well as the transfer eccentric 183, to enter the fugitive unit of the lowest decimal order. The precise manner in which this unit is entered is not necessary to an understanding of the present invention, and will, therefore, not be described. Upon the return of the shaft 134 to normal position, by parts of the transfer mechanism in the highest decimal order, the segment and dog 173 will return to their original position, the dog 173 ratcheting over one of the teeth 176 to allow the wheels 170 and 180 and the teeth 176 to remain in their moved positions. This places one of the teeth 176 of the other plane in a position to have its movement restricted by the arm 181 unless the arm and shaft 130 are moved to their opposite lateral positions for the next operation involving a passage of the highest wheel through zero.

During the normal operation of the machine, when the balance totalizer is in a positive condition and is overdrawn to a negative condition, the arm 181 will not prevent the entry of the fugitive unit. Likewise, when the totalizer is in a negative condition and is returned through zero to its positive condition, the arm 181 will not prevent the entry of the fugitive unit, since the four teeth 176 are rotated 90 degrees by each overdraft passage of the totalizer through zero. Thus, as long as the operation of the machine involves transactions causing the balance totalizer to pass through zero positively and negatively in alternate succession, the arm 181 will have no restraining action at any time, the totalizer being positioned alternately in its adding and subtracting positions during these operations involving the overdraft. However, should the totalizer have its capacity exceeded in either direction, the arm 181 will be effective to restrain the entry of the fugitive unit by lying in the path of a tooth 176 and thereby causing gear 164 to be held against rotation until the long tooth 139 passes the finger 132 and the spring 165 rotates shaft 134 and finger 132 to normal position.

The operation of this overdraft mechanism is given only in a general way since a very similar structure is fully shown and described in the above mentioned United States Patent No. 1,896,936, of February 7, 1933, to Bornkessel et al. See particularly Figs. 16 to 21 of that patent.

Overdraft control of totalizer selection

Fig. 9 also discloses mechanism for causing the overdraft mechanism to automatically select either of two totalizer selecting keys for depression. The mechanism operates in such a manner that whenever the totalizer is in a positive condition one of the two totalizer selecting keys is selected, and whenever the totalizer is in a negative condition the other totalizer selecting key is selected. In the present instance the keys selected are the blind positive and negative new balance keys situated in the transaction bank and used to select either of the two new balance totalizers for separately accumulating positive and negative new balances. The overdraft mechanism controls also the two blind keys 420, 422 associated with the motor key 424 in such a way that the plus key 420, or the minus key 422, is coupled with the motor key 424 in accordance with the positive or negative character of the total standing on the balance totalizer.

As above described, whenever the balance totalizer passes from positive to negative, or vice versa, the gear 180 receives a 90 degree rotation. By means of the mutilated construction of this wheel 180 (Figs. 7 and 9), a 90 degree rotation thereof will cause a sixty degree rotation of a wheel 184 and a disk 185 connected thereto by a sleeve 186, the parts 184 to 186 being loosely journaled on shaft 187. A triangular cam groove 188 is cut in the disk 185, and is so situated that it moves a roller 189 in one direction or the other during each 60 degree rotation. These movements of the roller 189, it will be observed, are alternate, so that each time the gear 184 is given a movement, the roller 189 will be moved in a direction opposite to its last movement. The roller 189 is situated on the upper end of a bell crank 190 connected by a link 191 to a lever 192, connected by a sleeve 193 to an arm 194 and an arm 494, the latter having pivoted thereto a vertical link 495, and the former a link 195. It is now obvious that 60 degree rotations of gear 184 will move link 195 and 495 upward or downward depending upon its previous movement. The link 195 is connected to a lever 196 (see also Fig. 12) pivoted on stud 197 and connected to a detent slide 97. The lever 196, together with an arm 196, supports the detent slide 97 for movement in the key bank. Two slotted levers 98 and 99 are pivoted to the slide 97 and are tensioned for outward movement by a spring 199 connected to both. These levers 98 and 99 have slots adapted to embrace studs 100 and 101 on the blind new balance keys, and are restrained in their outward movement by the studs 100 and 101. Each of the levers 98 and 99 has a long prong adapted to cooperate with a stud 96 (Fig. 12) on the upper arm of a bell crank 94 pivoted on the stud 95. Each lever also has a short prong adapted to contact studs 100 and 101 when the levers lie in a position where their long prongs cooperate with the stud 96. By this arrangement of parts it is evident that when the link 195 is in its upper position, the detent 97 will lie in its lower position where the long prong on lever 98 will contact the stud 96, and the short prong will contact the stud 100, so that upon clockwise rotation of the bell crank 94 the blind positive new balance key will be depressed, and when the link 195 is moved to its lower position by the balance totalizer being overdrawn, the slide 97 will be raised to its upper position where the long prong on the lever 99 will contact the stud 96, and the short prong will contact the stud 101, so that upon clockwise movement of the bell crank 94 the blind negative new balance key will be depressed.

Through a two-armed lever 415 (Figs. 11 and 15B) the connecting link 495 is linked to a detent 416 associated with the motor key bank. Pins of said detent carry two levers 417, 418 cooperating with pin 423 of the motor key 424 and the blind keys 420, 422 associated therewith, in a manner the same as that applied to levers 98 and 99 cooperating with the pin 96 of the angular lever 94 and the blind keys P—NB and N—NB for taking the new balances. When the cam disk 185 moves, the connecting rod 495 is moved into its upper position and, as a consequence, the detent 416 into its lower position, the lever 417 couples the blind key 420 with the motor key 424, and as the connecting rod 495 is moved into its lower position, the blind key 422 is coupled with the motor key 424 by the lever 418. Due to this connection, the motor key 424 is either coupled with the positive blind key 420 or the negative blind key 422, depending on whether the total on the balance totalizer is a positive or a negative one.

Selection of interspersed adding totalizers

The various interspersed totalizers situated in rows I, II, and III (Fig. 3) are selected for operation by the three rows of totalizers selecting keys shown in Fig. 1, as is customary in key set machines of this general character. The differential mechanism situated in these key banks (Figs. 14 and 20) shifts mechanism in the totalizer assemblies so that when the totalizer shafts are moved to engage the totalizers for actuation, the desired totalizer in each row will be coupled with the actuating mechanism.

The segment 105 that is differentially positioned under the end of a depressed totalizer selecting key corresponds to the segment 47 in the above mentioned United States Patent No. 1,792,569 to Ernst Breitling, and is connected by a short sleeve 308 (Fig. 20) to a segment 290 meshing with a pinion 291 secured to a short sleeve 292. A segment 293 also is secured to the sleeve 292 and meshes with a pinion 294 secured to a drum 295 rotatably mounted on shaft 34. As shown in Fig. 20, this drum is provided with a helical groove in its surface, in which rests a roller 296 mounted on a bent arm 297 secured to a plate 300 by a sleeve 298. As better shown in Fig. 21, the plate 300 embraces restricted portions in shafts 130 and 305 so that movement of the plate 300 to the right or left will impart a corresponding movement to these shafts. Shaft 130 is grooved to accommodate riders 160 that connect the actuating wheels 50 with the totalizer wheels 59, and shaft 305 is provided with a longitudinal groove 306 (see also Fig. 3) and notches 307, one for each decimal order, which constitute an aligning means so that only the totalizer wheel aligned with rider 160 will be free to rotate with the actuating wheel 50.

By the above mechanism, when the segment 105 is adjusted by operation of the differential mechanism (as fully described in United States Patent No. 1,792,569 to Ernst Breitling), the segments 290 and 293 are correspondingly adjusted and rotate drum 295. Such rotation adjusts plate 300 bodily to the right or left, causing a corresponding adjustment of the shafts 130 and 305. In this manner the various totalizers are selected under control of the depressed totalizer selecting keys.

Figure 15:
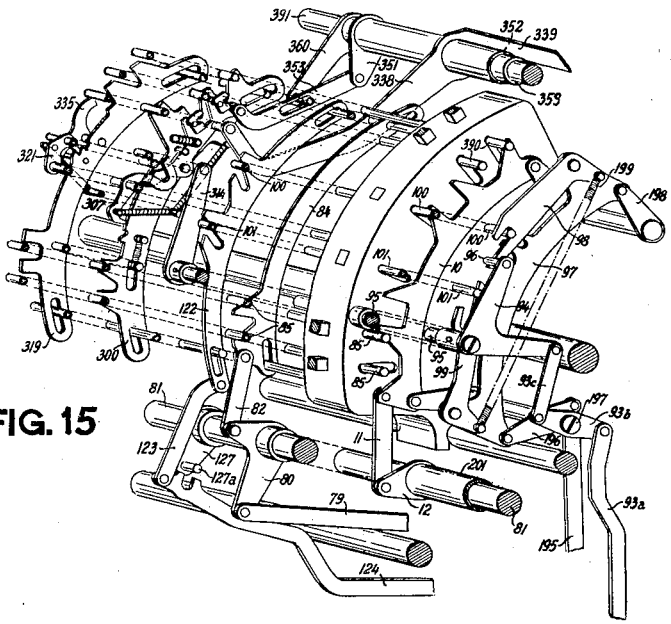
Fig. 15 is a perspective view showing the transaction key bank and mechanisms associated therewith.
Figure 15A:
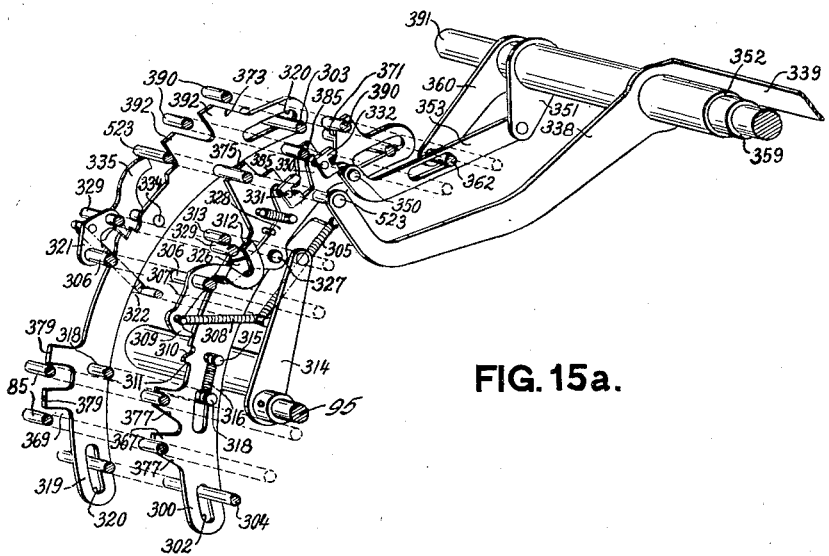
Fig. 15A shows a portion of Fig. 15 on an enlarged scale.

Selection of the proper side of the balance totalizer for adding and for taking the new balance This mechanism is disclosed in Figs. 2, 10, 11, 14, and 15. As hereinbefore mentioned, the six keys in the transaction bank control the selection of the positive and negative sides of the Balance totalizer. This control is exercised through the provision of a detent slide 10 (Figs. 14 and 15)

pivoted on two arms for movement in the key bank in the customary manner. The slide 10 has six cam portions, three of which cooperate with the Deposit, Positive new balance, and Positive old balance keys to select the positive side of the Balance totalizer, and three cams cooperate with the Withdrawal, Negative new balance, and Negative old balance keys to select the subtracting side of the Balance totalizer. The depression of any one of the first-mentioned keys causes the slide 10 to be moved upward in the key bank, while depression of any one of the last-mentioned keys causes the slide to be lowered. This raising or lowering causes a corresponding movement to be imparted to a link 11 pivoted to the slide 10 and to an arm 12 pivoted to the lower end of the link 11. This causes movement of a lever 13 (Fig. 11), connected to lever 12 by a sleeve 201, and movement of a link 14 connected to the lever 13, and further causes oscillation of a lever 15 connected to the upper end of the link 14 and pivoted on a stud 203. Oscillation of the lever 15 causes an upward or downward movement of a slide 16 supported by the lever 15 and by a stud 208. Slide 16 has levers 17 and 18 pivoted thereon and pressed outwardly by the tension of a spring 205 (Fig. 11) connected to both. The levers 17 and 18 each have a long and a short prong, the long prongs being adapted to contact the under side of a stud 23a on the motor key 24, while the short prongs are adapted to contact studs 19 and 21 on blind keys 20 and 22 situated on either side of the motor key. It is apparent from an inspection of the drawings that, when slide 16 is moved to its upward position by depression of one of the three keys for selecting the positive side of the balance totalizer, the short prong on the lower lever 17 will engage the stud 19 on the lower blind key 20, and the long prong will engage the stud 23a on the motor key 24. Likewise when any one of the three keys for selecting the subtracting side of the totalizer is depressed, the slide 16 will be lowered to the position shown in Fig. 11 and the upper lever 18 will contact the studs 21 and 23a for coupling the blind key 22.

A slide 206 (Figs. 10 and 15B) is suspended on studs 207 and 208 for movement in the motor key bank. This slide 206 has two cams 209 and two cams 210 situated under studs 19, 419 and 21, 421 on the blind keys in this bank. From an inspection of Fig. 10 it can be seen that when the blind key 20 or 420 is depressed, stud 19 or 419 will engage cam 209 and lower the slide 206, whereas when blind key 22 or 422 is depressed, stud 21 or 421 strikes cam 210 and raises slide 206. A pawl 211 is pivoted at 212 and is held by a spring 213 in engagement with either of two notches in slide 206. This pawl is provided so that this slide 206 will be held in either of its positions until positively moved to the other position by depression of one of the blind keys. A segment 214 is pivoted at 215 to the key bank and carries a stud 216 lying within a slot in the slide 206. A segment 217 meshes with the segment 214 and is secured to another segment 218 lying adjacent thereto. Segment 218 meshes with a pinion 219 secured to a gear 220. By this train of connections, movement of slide 206 causes a rotation of gear 220 and a pinion 221 (Fig. 2) meshing therewith and rotatable on a shaft 60. Pinion 221 has bevel teeth 222 secured thereon and meshing with cooperating bevel teeth on a smaller pinion 223. This small pinion 223 is pivoted on a stud 224 secured in a sleeve 225 surrounding shaft 60. Another pinion 226 is loosely mounted on sleeve 225 and meshes with a segment 227 secured to a sleeve 228 having a tongue connection with a drum 229. The drum 229 is connected by a link 230 with a kind of operation lever 141 shown in Fig. 1. Since the lever 141 remains in the Add position in which it is shown, during all the operations involved herein, the drum 229, sleeve 228, segment 227, and pinion 226 remain stationary at all times so far as the description of the following operations is concerned.

Reverting now to the movement imparted to the pinion 221 by depression of one of the blind keys 20, 420 or 22, 422, it is seen that rotation of the pinion 221 causes rotation of the small pinion 223 and sleeve 225 in the same direction. This causes a corresponding rotation of a pinion 231 secured to the opposite end of the sleeve 225 and to a helical cam drum 232 having teeth meshing with pinion 231 (Fig. 2). Rotation of this drum 232 causes a roller 233 lying within its groove to be shifted laterally. This roller is connected to an arm 234 secured to shaft 140, so that rotation of the drum 232 by movement of the above-described parts shifts the shaft 140 laterally. Shaft 140 is secured to a frame plate 235 carrying shafts 130 and 134, the lateral movement of which selects the adding or subtracting side of the balance totalizer, as clearly shown in Figs. 8A and 8B. From the above, it is seen that a depression of the Deposit, Positive new balance, or Positive old balance keys followed by depression of one of the motor keys 24 or 424 causes the Balance totalizer to be conditioned for adding, whereas a depression of the Withdrawal, Negative new balance, or Negative old balance keys followed by depression of one of the motor keys 24 or 424 causes the Balance totalizer to be conditioned for subtracting.

*Engaging and disengaging of the interspersed adding totalizers*

The means to engage and disengage the three rows of adding interspersed totalizers shown in Fig. 3 involves mechanism to move the totalizer wheels towards the central shaft 146 by swinging the wheels about shafts 236 as a pivot. This mechanism includes a cam 304 (Fig. 20) secured to shaft 34 and cooperating with rollers 302 and 303 on an arm 301 secured to shaft 236. This shaft 236 is secured to the totalizer frame so that, upon rotation of cam 304, the arm 301 and totalizer frame will oscillate about shaft 236 as a pivot. A side view of these parts is substantially the same as the showing of parts 251 and 252, 253, 254 in Fig. 4. This oscillation of the totalizer frame causes the actuating gears 50 (Fig. 3) to be engaged with intermediate gears 237 that are rotated differentially, through gears 238, by the large differential gear 157 under control of a depressed amount key. During adding operations the totalizers are engaged for actuation just before the differential mechanism returns home from its moved position, and are disengaged at the end of such return movement, while for total-taking, a selected totalizer line is engaged at the beginning of a machine operation and is disengaged after the differentials have been actuated to their moved positions. For subtotal-taking, the totalizers are engaged at the beginning of the operation and are left engaged until near the end of the operation, as is customary, and for non-adding operations they remain disengaged during the entire operation.

Figure 16:
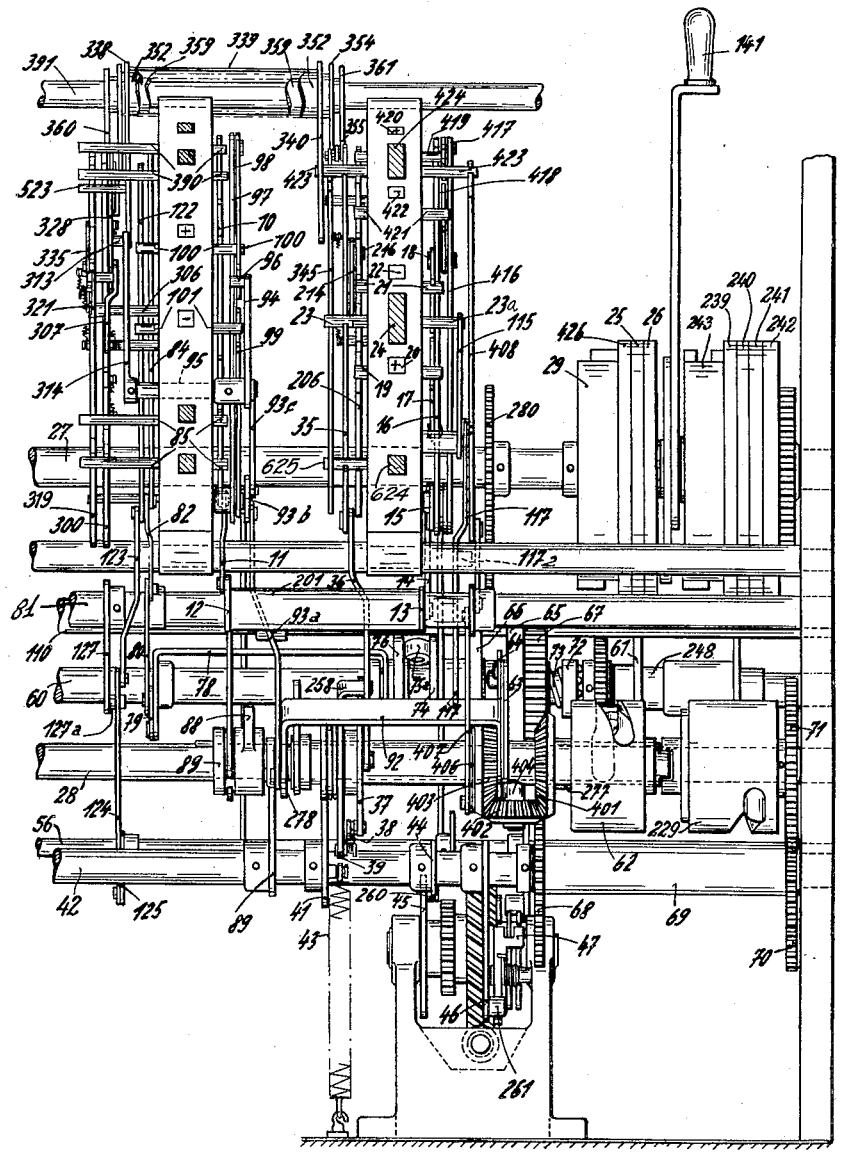
Figs. 16, 17 and 18 are front views of the transaction and motor key banks and associated mechanisms.
Figure 17:
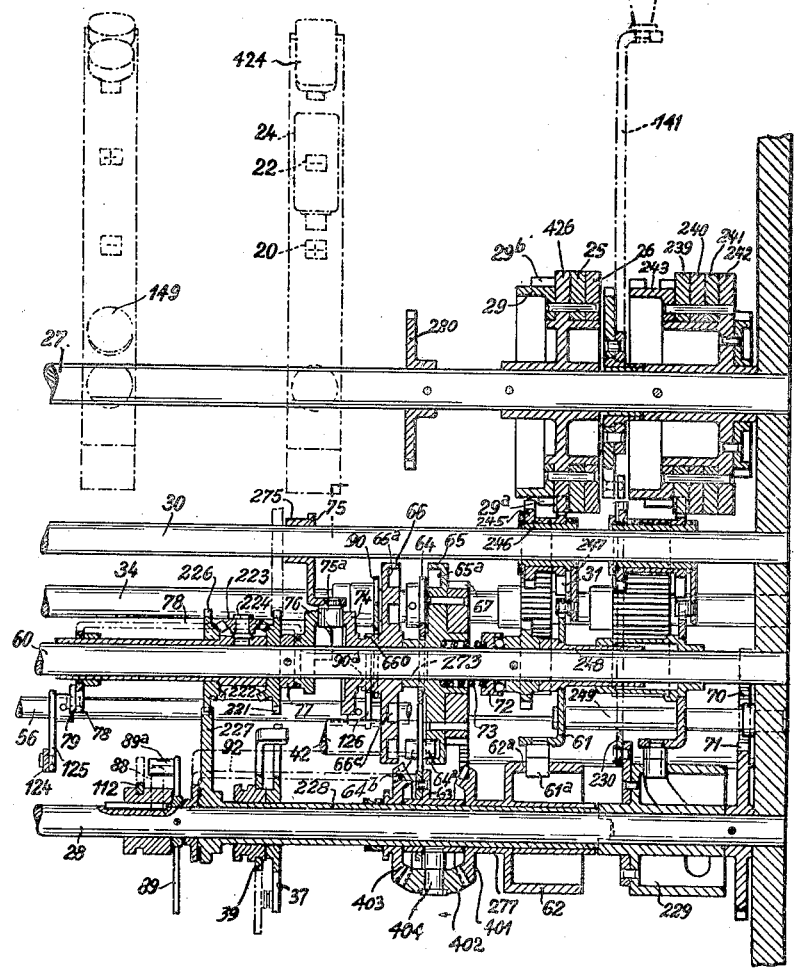

The mechanism for controlling the timing of these four different types of operations includes four disks 239, 240, 241, and 242 and a drum 243 (Figs. 16 and 17). A Geneva gearing also shown in Fig. 17, but not numbered, cooperates with these disks and drum, and with a wide gear, to oscillate the shafts 236 (Fig. 3) to engage and disengage the totalizers in rows I, II, and III at the proper time. The shifting of the Geneva gearing to cooperate with these disks and the drum is accomplished by movement of the kind of operation lever 141 that rotates the drum 229, as clearly shown in Fig. 2. However, since the details of the timing mechanism for the interspersed adding totalizers are not necessary to an understanding of the present invention, they are not shown. It might be mentioned, however, that movement of the kind of operation lever 141 (Fig. 2) to one of its totaling positions rotates the pinion 226 through the operation of segment 227, sleeve 228, and drum 229, to rotate the small pinion 223, sleeve 225, pinion 231, and drum 232 to slide shaft 149 longitudinally to such an extent that the actuating riders 160 (Fig. 8) for the Balance totalizer are moved out of engagement with the adding and subtracting wheels 57 and 59. This prevents the Balance totalizer from taking part in any operation involving the taking of totals from any of the interspersed totalizers in rows I, II, and III.

*Engaging and disengaging mechanism for balance totalizer*

Figure 19A:
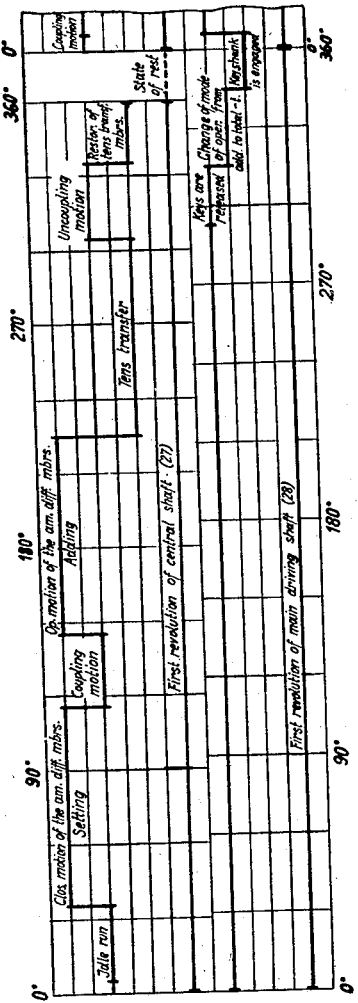
Figs. 19A and 19B are time diagrams of the machine operations.
Figure 19B:
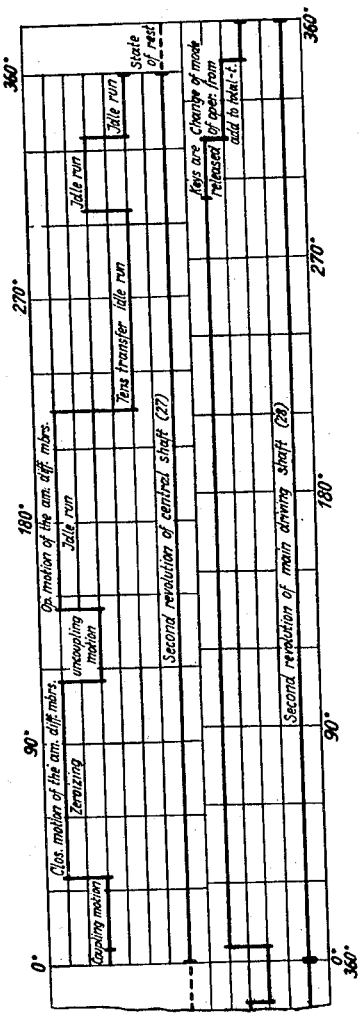
Figure 30:
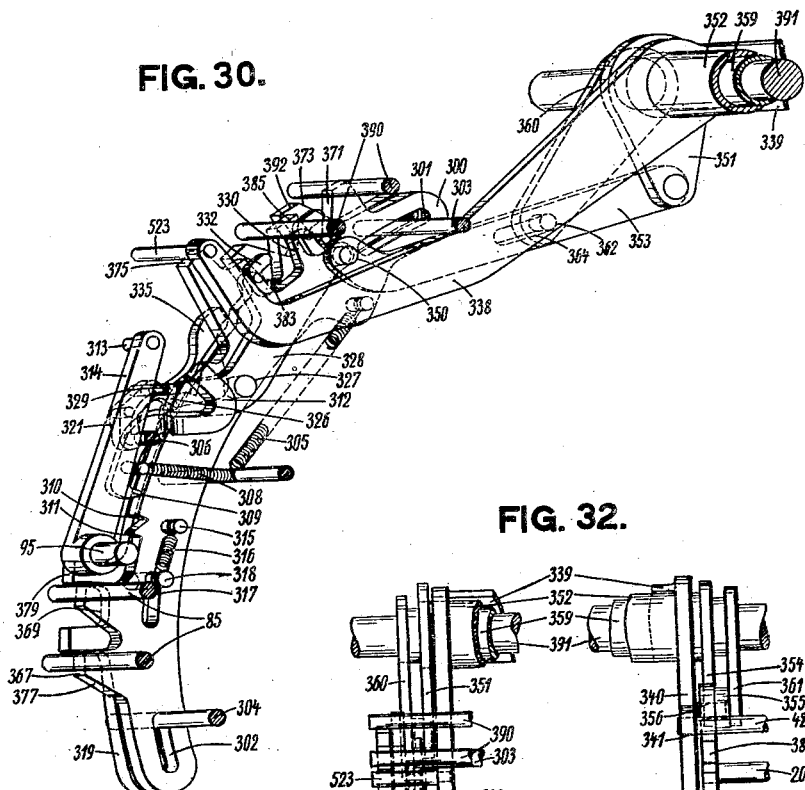
Figure 32:
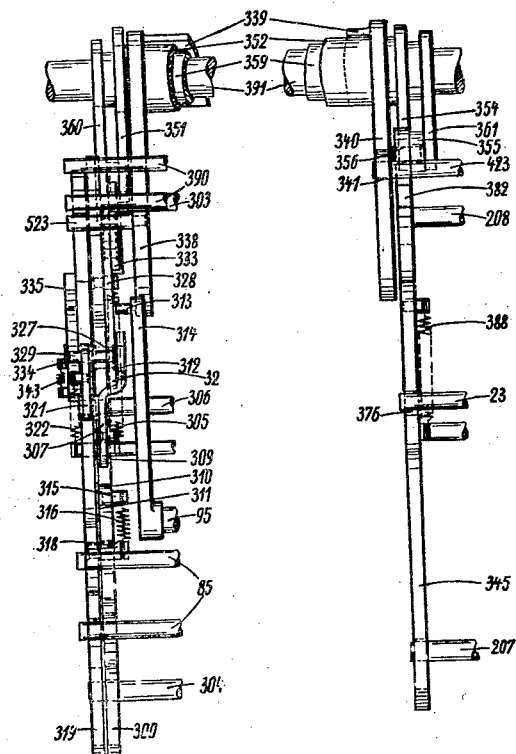
Fig. 32 is a front view of the locking device for the transaction and motor keys.

The engaging and disengaging mechanism for the Balance totalizer includes the disks 25, 26, and 426 and the drum 29 (Figs. 11, 15B, and 17) that cause the Balance totalizer to be engaged with the actuators during their return motion for adding, and during their initial motion for total-taking, or, as it is called in this case, the taking of the New balance, and during their initial and return motion for intermediate total-taking. The disks 25, 26, and 426 and the drum 29 are secured together and rotate as a unit with shaft 27, to which they are pinned. This shaft 27 receives one full revolution during each operation of the machine, the shaft, however, coming to rest a short time before the machine finishes its operation (Fig. 19A). This shaft is rotated by the main drive shaft 28 through a convenient form of Geneva gearing. However, since the details of such gearing are not necessary to an understanding of the present invention, they are not shown.

Cooperating with the disks 25, 26, and 426 is a Geneva pinion 31 (Fig. 11) having four teeth and connected to a pinion 245 by a short sleeve (Fig. 17). The pinions 31 and 245 rotate on a collared sleeve 246 slidable on shaft 30 and rigidly connected with a short arm 247 (Fig. 11). A frame piece 61 is secured to the arm 247 and is secured to a sleeve 248 slidable on the shaft 60. A stud 249 (Fig. 17) extends from the side frame of the machine into an aperture in the frame piece 61. A roller 61a secured to the lower end of the frame piece 61 extends in a helical slot (Figs. 16 and 17) in a drum 62 rotatable on a sleeve 229 on shaft 28. From the above construction it is apparent that rotation of the drum 62 will cause a shifting of the frame piece 61 on the shaft 60, the frame piece being held against rotation about shaft 60 by the stud 249. This shifting of the frame piece causes a corresponding shifting of the arm 247, sleeve 246, pinion 245, and Geneva wheel 31, as these latter two parts will selectively cooperate with the disks 25, 26, and 426 and with different portions of the drum 29. When the parts are in the position shown in Fig. 17, the Geneva wheel 31 will cooperate with disk 426, and pinion 245 will cooperate with teeth on the left side of drum 29. This is the position which the parts assume when they are set for taking an intermediate total. Fig. 16 shows the position of the parts when they are set for addition.

Referring now to Fig. 11, we find that with the parts in add position, teeth 29b at the top of the drum 29 will rotate a pinion 245 90 degrees to engage the Balance totalizer after the differentials have been shifted to their moved positions. Near the end of the machine operation, teeth 29c, appearing at the bottom of the drum 29 in Fig. 11, will rotate pinion 245 90 degrees to disengage the totalizer after the differentials have completed their return movement. During these rotations of pinion 245, the openings 25a and 25b in the disk 25 each receive one of the teeth of the Geneva wheel 31 in order to permit the rotation of wheel 245. These teeth 31, of course, prevent movement of wheel 245 at any other time by reason of their locking relation with the unbroken portions of disk 25.

When it is desired to take the New balance from the Balance totalizer, the drum 62 is rotated by mechanism to be described later, so that the Geneva wheel 31 and wheel 245 will lie opposite the disk 26 and the right-hand side of drum 29, respectively. With the parts in this position, teeth 29a (Figs. 11 and 17) rotate pinion 245 at the beginning of the operation of the machine, so that the Balance totalizer will be engaged with the actuators during their initial movement. After the actuators have finished their initial movement, teeth 29b impart another 90-degree rotation to the gear 245 to disengage the totalizer. During these movements of wheel 245, the openings 26a and 26b (Fig. 11) accommodate teeth on the Geneva wheel 31 to permit rotation of the gear 245. In this instance also, the Geneva wheel receives no movement except as above specified, because of the locking relation between the teeth of the Geneva wheel and the unbroken portions of disk 26. If a sub-total is to be taken from the Balance totalizer, the cam drum 62 is rotated in a manner set forth hereinafter, whereby pinion 31 is aligned with disk 246. The notches 426a, 426b permit the pinion 31, 245 to be rotated by 90 degrees at the beginning of the machine operation and again by 90 degrees at the end of the machine operation, while the unmutilated portion of the circumference of the disk 426 holds the pinion 31, 245 locked meanwhile.

A larger gear 250 partakes of the 90-degree rotation of gear 245 and conveys this motion by suitable gearing to the shaft 251 (Fig. 4). The connections between gear 245 and shaft 251 are such that a 90-degree rotation of gear 245 imparts a 180-degree rotation to the shaft 251, but since the details of this gearing are not necessary to an understanding of the present invention, they are not shown. From Fig. 4 it is obvious that a 180-degree rotation of shaft 251 will rotate the eccentric 262 a corresponding amount and thereby oscillate arm 253 secured to shaft 254 of the Balance totalizer. Oscillation of this shaft engages the actuating gears 50 of the Balance totalizer with the actuating pinions 159 in the same manner as above explained in connection with the shafts 236 (Fig. 3) for the interspersed adding totalizers.

Machine release mechanism

The mechanism for releasing the machine for operation is shown in Figs. 10 and 15B. It is controlled by depression of the motor key 24 (see also Figs. 36, 37, and 38), 424, or 624 and causes the closing of an electric switch to start an electric motor. It also engages a clutch to couple the machine drive with the motor shaft.

The motor key 24 (Figs. 36, 37, and 38) is provided with a stud 23 secured directly to the body of the key shank. A stud 23a is carried by a block 582 slidably mounted in a recess 581 of the key shank, as clearly illustrated in Fig. 37. A spring 583 normally holds the block 582 in elevated position, wherein the studs 23 and 23a are held in contact with each other in axial alignment and form the equivalent of a single stud. When the key 24 is depressed, the stud 23 coacts with an extension 376 on a slide 345 and with a detent slide 35 in a manner hereinafter described, and stud 23a coacts with elements 17, 18 and 813a (Fig. 37) as hereinafter described. The purpose of providing the two studs 23 and 23a will be hereinafter described. During certain operations, later described, the key block 582 is automatically depressed by a lever 115 engaging stud 23a.

The detent slide 35 is supported in the motor key bank and has three cams 256 and 257 and 627 lying under the studs 23, 423, and 625 of the motor keys 24, 424, and 624, respectively. Depression of a motor key, through studs 23, 423, or 624, moves the slide 35 and link 36 downward and rotates a lever 37 loose on shaft 28 counter-clockwise. Another lever 39 is loose on shaft 28 and carries a flange 258 on the upper arm thereof lying in the plane of the upper arm of lever 37. The lower arms of levers 37 and 39 are pulled toward each other by a spring 38. A shoulder 259 lies in the plane of a block 40a secured to a pitman 40 having one end forked to straddle shaft 28 and pivoted at its other end to a lever 41 secured to release shaft 42. Shaft 42 has also secured thereto an arm 44 extending rearwardly into the path of a block 260 secured to the side of a clutch disk 45, and further has secured thereon a downwardly extending lever 46 with a stud 261 at the lower end thereof. A release pawl 47 is pivoted at 262 to a portion of the machine frame, and is spring-pressed toward a clutch shaft 263 by the coil spring shown. By the parts just described, the counter-clockwise movement of lever 37, resulting from depression of the motor bar, rotates lever 39 counter-clockwise and removes shoulder 259 from the path of block 40a. This leaves the lever 41 free to move the pitman 40 to the left through the tension of a spring 43 attached to the forward arm of lever 41, and causes a counter-clockwise rotation of the release shaft 42. This rotation of shaft 42 causes the arm 46 to move the pawl 47 out of the path of a disk 265 and moves lever 44 out of the path of block 260. Movement of the pawl 47 allows the disk 265 to rotate counter-clockwise under the tension of a spring 266 and thereby rotate a switch-closing lever 267 clockwise about its pivot 56. This movement of lever 267 is caused by a roller mounted on the forward end thereof cooperating with a cam surface on the upper part of disk 265, and serves to close the contacts 268 to start the motor. Removal of the lever 44 from the path of the block 260 leaves the machine free to operate. The operation of this clutch mechanism is given only in a general way, since such mechanisms are well known in the art and since the details thereof are not necessary to an understanding of the present invention.

Key release mechanism

Figure 12:
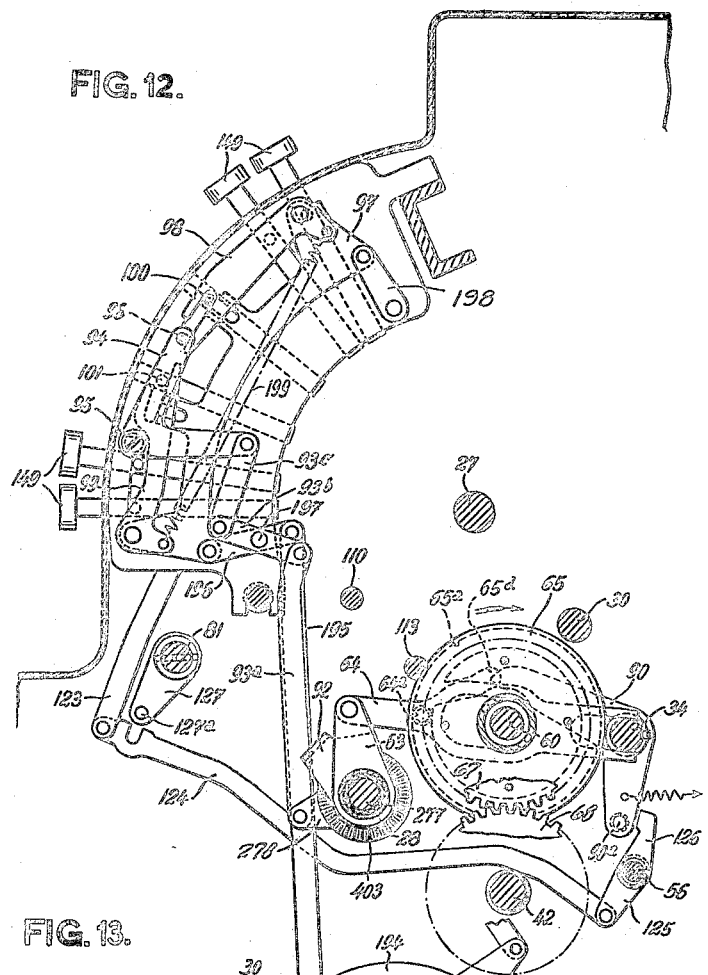
Fig. 12 is a side view of the transaction key bank showing the connections with the device for automatically taking the new balance.

The mechanism to release the depressed keys during an operation is operated near the end of a machine cycle (Figs. 19A and 19B) and is operated by an oscillation of shaft 81 counter-clockwise, as viewed in Fig. 12.

Secured to the shaft 81 (see also Fig. 3) adjacent each key bank is an arm 810, coacting with a lever 811 pivoted to the associated key bank frame. The lever 811, and a lever 812, between them support a key detent 813, which is provided with the usual recesses to engage a stud 814 of a depressed key 150 to maintain the key depressed during the machine operation. A spring 815 normally presses the inclined edges of the detent into contact with the studs 814 of the undepressed keys 150. The usual spring is provided to urge the keys into their undepressed positions. Counter-clockwise rotation (Fig. 3) of shaft 81, near the end of each machine operation, through arm 810, raises lever 811 and detent 813 to permit the depressed keys to be released to the action of their individual springs.

Adjacent the release bank (Fig. 23) is an arm 452 loose on sleeve 201 connected to shaft 81 by a screw stud 453 which projects through a slot 454 (Fig. 39) in sleeve 201 to permit the sleeve to operate independently of the shaft 81 and arm 452. The arm 452 coacts with a lever 451 pivoted on the side of the key bank frame. The arm lies in the plane of an extension of a stud 455 connecting link 36 to bar 35. Thus, clockwise rotation (Fig. 23) of shaft 81 rocks arm 452 clockwise and lever 451 counter-clockwise to raise the control bar 35 to release the depressed motor key 24 or 424.

Also adjacent the release bank is a detent 813a (Fig. 37) similar to the detent 813 for the amount banks, which coacts with the stud 23a to hold the stud 23a and plate 582 depressed, for a purpose later described.

The shaft 81 is rocked at the end of each machine cycle by a cam 816 (Fig. 35) secured to shaft 28, which shaft receives one rotation during each machine cycle of operation. A roller 817 on an arm 818 is resiliently held in contact with the periphery of the cam 816 by springs 815 (Fig. 3). The arm 818 is loose on shaft 42 and is connected to an arm 820 by a link 819. The arm 820 is secured to the shaft 81. The springs 815 (Fig. 3) tend to lower detents 813, which tend to rock arms 811 counter-clockwise, and arms 810, shaft 81, and arm 820 clockwise, thus pulling link 819 toward the left (Fig. 35) and the roller against the cam 816.

Near the end of each machine cycle, the cam 816, through the connections 813, 819, and 820, rocks shaft 81 counter-clockwise and, through arms 810 and 811, raises the detents 813 to release the depressed amount and control keys, and, through arms 451 and 452, raises detent 35 to release the depressed motor key. When the detent 35 is raised, the spring 38 (Fig. 10) is tensioned, since at this time arm 39 is held by block 40a.

The shape of cam 816 is such that the spring 38 returns detent 35 to its lower position immediately after the motor key is released, and prior to the end of the machine cycle. The spring 1276 is provided to return the detent 35 to its normal position at the end of the machine cycle. A detent 813 is provided in each bank of keys.

Restoring mechanism for machine release

When the machine completes a cycle of operation, it is necessary that the release shaft 42 (Fig. 10) be returned to the position shown in this figure so that the motor switch will be opened and the machine brought to rest. The parts for returning this shaft to its normal position are shown in Figs. 14, 16, and 17 and include a cam 88 (Fig. 14) lying normally in the plane of a roller 89a mounted on the upper end of an arm 89 secured to the release shaft 42. The cam 88 is mounted on shaft 28 which, it will be remembered, was described as the main operating shaft of the machine. The cam 88 is held against rotation on shaft 28 by a spline 269, so that during normal operations of the machine the cam 88 will cause the arm 89 to rotate shaft 42 and carry with it lever 41 and pitman 40. This movement of pitman 40 to the rear removes the block 40a (Fig. 10) from under the shoulder 259 and thereby allows the levers 37 and 39 to return to their normal position shown in Fig. 10 under action of spring 1276, which movement causes the detent 35 to return to its normal position. This movement of shaft 42 also lowers arm 44 (Fig. 10) into the path of block 260, and moves arm 46 away from pawl 47 to allow the same to engage disk 265. Upon completion of the rotation of disk 265, the motor switch is disengaged and the machine brought to rest.

Automatic cycle mechanism for taking a new balance

As heretofore mentioned, the invention includes a mechanism to automatically cause the machine to take a New balance immediately after an Old balance is introduced into the machine, and to transfer this New balance into one of two New balance totalizers according to its positive or negative character. The introduction of the Old balance is accomplished by depressing the appropriate amount keys together with either the P—OB or N—OB key, depending upon the positive or negative character of the Old balance, and a depression of the motor key 24. The resulting operation causes the Old balance to be entered on the Balance totalizer during the first cycle thereof. The depression of one of these two keys, as will appear later, causes mechanism to be set so that upon the completion of this one cycle the machine automatically continues for a second cycle during which the New balance is taken from the Balance totalizer and entered into one of the two New balance totalizers in the Transaction bank.

To accomplish this, various mechanisms must be adjusted so that the proper set-up for a totaltaking operation will be automatically made at the end of the first cycle. This must include a means to cause the machine to continue operation for the second cycle, a means to change the time of engaging and disengaging the Balance totalizer, a means to select and depress the proper one of the two blind New balance totalizer keys in the Transaction bank, and a means to select the proper side of the Balance totalizer by selecting and depressing one of the blind keys at the beginning of the second cycle. The mechanisms for accomplishing these various functions will now be explained in detail under appropriate headings.

Means to prevent restoration of machine release

Figure 18:
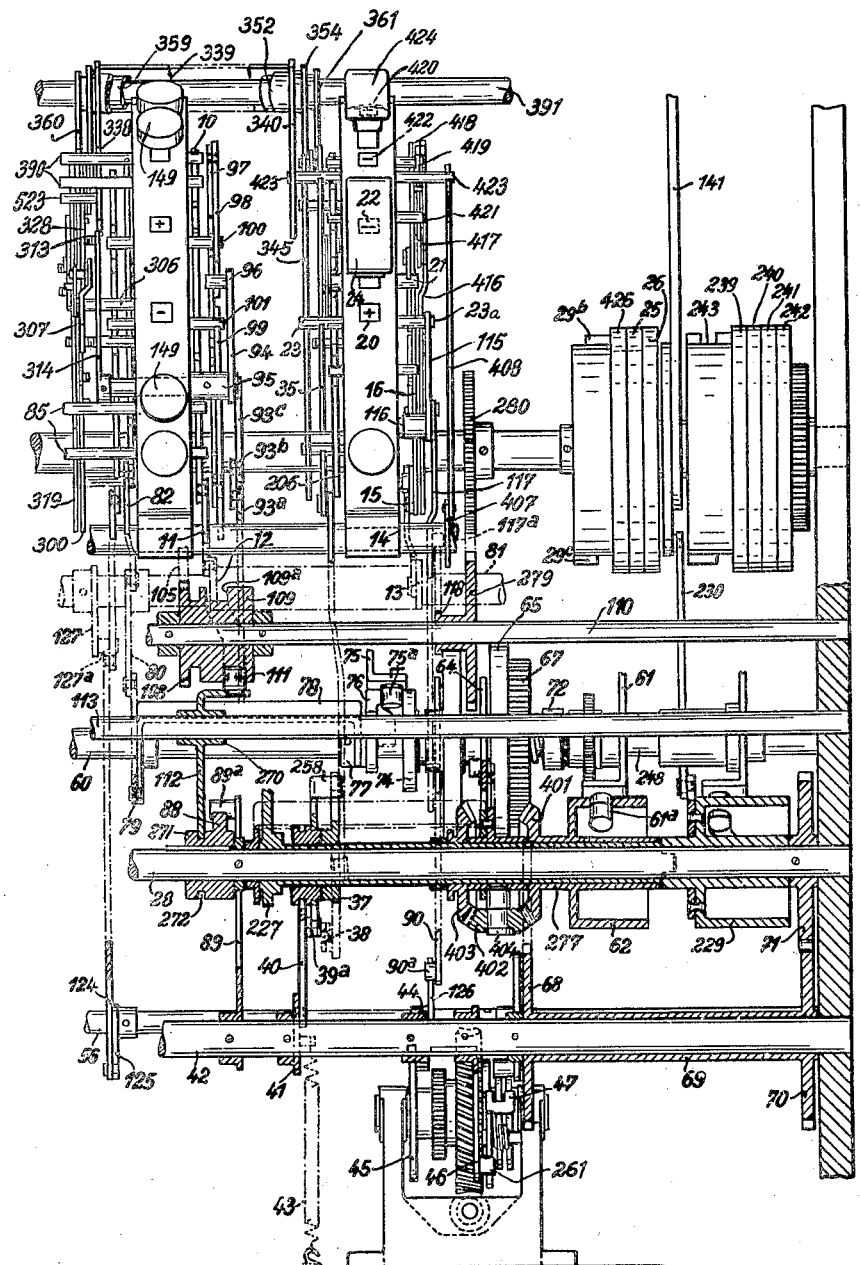

This mechanism is shown in Figs. 14, 16, and 18 and includes a helical cam drum 109 rotatable on shaft 110 and having a gear 108 as a part thereof, which gear meshes with teeth on the differential member 105. The helical groove in drum 109 receives a roller 111 mounted on a flange on the upper end of an arm 112. This arm has a sleeve portion 270 embracing shaft 113 so that on rotation of the drum 109 the arm 112 may move along shaft 113. The lower end of arm 112 is bifurcated so as to straddle the hub portion 271 of the restoring cam 88, and lies within a groove 272 therein. From Fig. 14 it is evident that when one of the two Old balance keys P—OB or N—OB is depressed, the differential member 105 will be moved opposite the inner end of the depressed key, causing drum 109 to rotate and shift arm 112 and cam 88 to the left (Figs. 16 and 18), so that at the end of the first cycle of the machine the cam 88 will lie out of the path of roller 89a so as not to disengage the machine drive at the end of this cycle.

It might be here stated that during the first cycle of this operation the depressed Old balance key is released and one of the New balance keys is depressed, so that during the second cycle the member 105 is repositioned so as to lie under the inner end of one of the two blind New balance keys. This causes a rotation of drum 109 to such an extent that the cam 88 is restored to its normal position as shown in Figs. 16 and 18, so that near the end of the second cycle it will be effective to bring the machine to rest.

Automatic cycle control cams

In order to automatically actuate certain controls for the automatic cycle mentioned above, a pair of cam disks 65 and 66 (Figs. 11 to 13) are provided. These disks are controlled to become effective by depression of the Old balance keys and are operated by the machine drive. The specific functions performed by these disks will be given in detail under appropriate headings, but first the specific manner in which they are controlled and driven will be explained. These two disks (Figs. 12, 13, and 17) are loosely mounted on shaft 60 and have their hub portions connected by a tongue 273 (Fig. 17) so as to always move in unison. A wide gear 67 (Figs. 12, 16, and 17) is secured to this assembly and meshes with a gear 68 (Figs. 11, 12, and 16) connected to a sleeve (Figs. 11 and 16) which connects them to a gear 70 meshing with a gear 71 secured to the main drive shaft 28. By this train of gears, the disks 65 and 66 receive one complete rotation during each machine cycle. As best shown in Fig. 17, disk 66 has an elongated hub portion on which is formed a disk 74, the left side thereof contacting a roller 75a on an arm 75 (see also Fig. 10) slidable on shaft 30 and bifurcated at its rear end to straddle a rod 274. A short sleeve 275 (Fig. 17) is provided on the arm 75 to aid the sliding movement of this arm on shaft 30. A cam segment 76 (Figs. 10 and 17) is pivoted on shaft 60 and contacts roller 75a. A spring 73 (Fig. 17) presses against the disk assembly and against a thrust collar 72 having a ball race in one side thereof bearing against the hub of a pinion secured to the shaft. The spring 73 causes the disk assembly to be under constant pressure to the left (Fig. 17) so that the disk 74 and roller 75a are held constantly against the cam surface of segment 76, which in turn is held against movement to the left by collar 77 pinned to the shaft. From Fig. 17 it is apparent that a rotary movement of segment 76 will cause a movement of roller 75a and the disk assembly to the right against the pressure of the spring 73. It will be noted that movement to the right or left does not affect the rotary operation of the disk assembly, since the wide gear 67 meshes with its driving gear 68 in either lateral position.

Segment 76 is rotated directly by depression of one of the Old balance keys, as shown in Figs. 10, 14, and 16. Referring to Figs. 14 and 15, depression of one of these keys moves the detent slide 84 and its link 82 downward, and through bell crank 80 moves link 79 rearwardly in the machine and thereby rotates a yoke 78 supported on shaft 60, counterclockwise (Fig. 10) to rotate segment 76 correspondingly and thereby shift the roller 75a and disk assembly to the right (Fig. 16).

When the disk assembly is shifted as stated, a bell crank 90 (Fig. 12), pivoted on shaft 34 and spring-pressed counter-clockwise, falls into a groove 66b (Figs. 16 and 17) in the hub portion of disk 66, to restrain the disk assembly in its right-hand position against the compression of spring 73. This occurs, of course, before the machine begins its operation. The disk assembly remains in this right-hand position until near the end of the second cycle, when the lever 90 is released, in a manner explained hereinafter, to allow spring 73 to return it to its normal position. At that time it will be free to return, since the depressed Old balance key will have been released at the end of the first cycle, allowing the cam segment 76 and the train of connections between it and the slide 84 to be returned at the same time by the usual spring similar to spring 275 shown connected to slide 122 in Fig. 14.

The cam disk 65 (Fig. 12) is provided with concentric groove 65a and a short connecting cam groove 65d, while the cam disk 66 (Fig. 13) carries two concentric grooves 66a and 66c connected by a cam groove 66d. A pitman 64 is pivoted to an arm 63 secured to a yoke 92 journalled on shaft 28 and is bifurcated at its rear end to straddle shaft 34. This pitman carries a stud extending from both sides thereof on which are mounted two rollers 64a and 64b (Figs. 12 and 13) respectively. As better shown in Fig. 17, when the disk assembly is in its normal position, roller 64a engages the concentric groove 65a so that, during adding operations of the machine, the pitman 64 receives no movement whatever. During the two-cycle operation, however, when the disk assembly is moved to the right, disk 66 is moved into engagement with roller 64b. Now, referring to Fig. 13, upon operation of the machine, pitman 64 remains in its normal position during the greater part of the first cycle; that is, while the Old balance is being entered, but when the cycle is nearly complete, the cam portion 66d moves the pitman to the right, causing a clockwise rotation of arm 63 and yoke 92.

*Changing the timing for engagement and disengagement of the balance totalizer*

After the Old balance is entered during the first cycle, the timing of the engaging mechanism for the Balance totalizer must be changed so that the total may be taken therefrom during the second cycle. This means that the totalizer must be engaged at the very beginning of the second cycle and disengaged after the actuators have received their initial movement. To accomplish this, the drum 62 (Figs. 11, 16, and 17) for shifting the timing mechanism, in the manner above explained, is connected to the arm 63 by a bevel gear mechanism. With the drum 62 is connected a pinion 401 by a sleeve 277. The pinion 401 is in mesh with a bevel gear 402 which is rotatably mounted on a stud 404 fixed on the hub 405 of the arm 63. On the other side, the bevel gear 402 is in mesh with a bevel gear 403 which is connected to an arm 406 (Fig. 15B). This arm is connected by a link 407 (see also Fig. 22) to a slide 408 associated with the motor bar 424, which may cooperate with the stud 423 of the motor key 424. Normally—that is, when the motor key 424 is not depressed—this slide 408 is held in its lower position, so that the bevel gear 403 is fixed during the introduction of the Old balance and the taking of the New balance. Now, when the pitman 64 is moved to the right (Fig. 13) near the end of the first cycle, the drum 62 will rotate in clockwise direction and shift the timing mechanism for the second cycle. If a sub-total of more transaction amounts is to be taken from the Balance totalizer, the motor key 424 is depressed. The pin 423 of the motor key 424 cooperates with an inclined slot of the detent 408 in such a manner that the detent 408 is moved upward and the bevel wheel 403 is rotated through a certain angle by means of the link 407 and the arm 406. By means of the small bevel wheel 402, the pivot 404 of which is held arrested during this time, the rotation of said wheel is transferred to the gear 400 and, consequently, to the cam drum 62 also. The cam groove 62a of said drum is so formed that, by means of the arm 61, the pinion 31 is shifted to the left by one step into the plane of the mode of operation disk 426, which causes a sub-total to be taken from the Balance totalizer.

*Depression of positive or negative New balance key selected by overdraft mechanism*

After the Old balance is entered during the first cycle, it is also necessary to depress one of the blind New balance totalizer keys in the transaction bank so that the amount taken from the Balance totalizer during the second cycle will be accumulated into the proper Balance totalizer. Referring to Figs. 12 and 15, an arm 273 is formed on one end of the yoke 92 and is connected through link 93a, lever 93b pivoted at 197, and link 93c, to a bell crank 94 secured to a shaft 95. The upper arm of bell crank 94 carries a stud 96 lying in the plane of levers 98 and 99. From these connections it is apparent that when pitman 64 receives its movement to the right during the very last part of the first cycle, bell crank 94 will be rotated clockwise with the shaft 95 as a pivot, and thereby cause the depression of one of the New balance keys. The particular one of these keys that will be depressed depends upon the positive or negative condition of the Balance totalizer at the completion of the entry of the Old balance through the selection made by the overdraft mechanism above explained.

The selection of the proper side of the Balance totalizer for taking the New balance, as explained above, depends upon which one of the keys in the Transaction bank is depressed. This, it will be recalled, is accomplished by the stud 100 or 101 on the depressed key camming the detent slide 10 (Figs. 14 and 15) up or down and thereby moving one of the levers 17 or 18 (Figs. 11 and 15B) into cooperation with stud 23a on the block 582 of the motor bar 24, which, upon depression, depresses one of the blind keys 20 or 22 to shift slide 206 (Fig. 10) and its connections to the Balance totalizer, to cause the proper side thereof to be connected with the actuating mechanism for the ensuing operation. When one of the New balance keys is to be depressed and lever 17 or 18 is connected with the stud 23a of the block 582 of the motor bar 24, the positive side of the Balance totalizer will be connected with the actuators, if the Positive new balance key was depressed, and the negative side of the Balance totalizer will be connected with the actuators if the Negative new balance key was depressed, upon the subsequent depression of the block 582 of the motor bar 24 that immediately follows.

Referring now to Fig. 11, a bell crank 115 is pivoted at 116 and has a bifurcated upper end embracing the stud 23a on the block 582 of the motor bar 24. The horizontal arm of the bell crank is connected to a link 117, the lower end of which lies directly behind the yoke 92 (see also Fig. 15B). When yoke 92 is moved to the right at the very end of the first cycle, it swings link 117 to the right and causes a stud 117a thereon to be moved into the path of an arm 118 secured to the hub of a gear 279 (Figs. 11 and 18) rotatable on shaft 110 and meshing with a gear 280 secured to shaft 27 for rotating during each operation. Referring to Fig. 19, since this shaft begins to rotate at the beginning of the second cycle, arm 118 will at once depress link 117 and thereby pull the stud 23a and block 582 of the motor bar 24 in. Continued rotation of gear 279 causes shoulder 118 to move out of the path of stud 117a, but since the stud 23a has been fully depressed and the machine started on its second cycle, it remains in that position as in a normal adding operation, held by a locking detent 813a, similar to detent 813 (Fig. 3) for the amount bank.

It might be stated here that, toward the end of the first cycle of operation, the motor key was released from its original depression when the key release shaft 81 was operated, and that the slide 35, link 36, and lever 37 returned to their upper positions through arms 451 and 452. The return of these elements, of course, was not accompanied by a corresponding return movement of lever 39 (Fig. 10), since the block 40a was not moved from under the shoulder 259 at the end of the first cycle. The return movement of the parts 35, 36, and 37 was, instead, accompanied by a tensioning of spring 38. After the motor key has been released, and while the arm 452 is being restored to its normal position, the spring 38 lowers the parts 35, 36, and 37 into their moved positions.

With the depression of the block 582 and stud 23a of the motor key 24 at the beginning of the second cycle, the machine is completely conditioned for taking the New balance and, since one of the blind New balance keys P—NB and N—NB is depressed, for transferring it to an appropriate totalizer.

Taking a sub-total from the Balance totalizer is effected in a manner other than as detailed for taking a New balance. In this connection, it may be pointed out that at this time the pitman 64 remains coupled with the cam disk 65, as is the case during the introduction of an amount. Due to this, none of the keys P—NB or N—NB is operated; that is, the total taking from the Balance device is not transferred to one of the accumulators for storing the new credit or debit balances, as is the case during the automatically following second machine operation for striking the New balance.

Restoration of parts at the end of the second cycle

Figure 13:
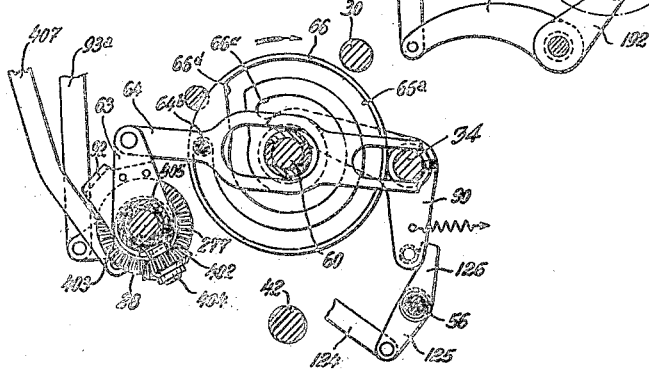
Fig. 13 is a side view of details of Fig. 12.

As heretofore explained, the disk assembly is returned to normal position during the latter part of the second cycle. This is accomplished in the following manner:

Depression of one of the New balance keys at the end of the first cycle causes an upward movement of the slide 122 (Figs. 14 and 15) and a corresponding upward movement of links 123 and 124 connected to the slide 122. The forward end of link 124 is slotted, so that an upward movement thereof causes it to embrace a stud 127a on the lower end of an arm 127 secured to the release shaft 81. Now, during the latter part of the second cycle, after all calculation is completed, the release shaft 81 is again operated and moves link 124 to the left (Fig. 12) and to the right (Figs. 13 and 15). Since this link is connected at its rear end to an arm 125 secured to shaft 56, this movement of the link will cause shaft 56 to be rotated counter-clockwise (Fig. 13) and to carry with it arm 126 also secured thereto. Since the lever 90 is at this time lying in groove 66b (Fig. 17), the roller 90a on the lower arm thereof lies against arm 126, so that the counter-clockwise movement of this arm raises the forward end of lever 90 out of the groove and allows the disk assembly to snap to the left under the tension of spring 73. This movement of the disk assembly causes groove 65d in disk 65 to be moved into engagement with roller 64a, so that during the remainder of the rotation of the disk assembly, pitman 64 is cammed to its original position shown in Fig. 12.

The return of pitman 64 causes the bell crank 94 to assume its normal position and thereby allow spring 199 and levers 93 or 99 to return the depressed New balance key. The return of pitman 64 also causes a return movement of drum 62 (Figs. 11, 16, and 17) to restore the timing mechanism for the engagement of the Balance totalizer to normal or adding position.

As already mentioned, the differential mechanism in the Transaction bank (Fig. 14) shifted cam 88 back to its original position in line with roller 89a, so that at the end of the second cycle it effects a rotation of release shaft 42 to remove block 40a from under shoulder 259 and arm 46 away from pawl 47 and to place the arm 44 in the path of block 260 to stop the machine. When the block 40a is moved from under the shoulder 259, spring 1276 (Fig. 23) becomes effective to move levers 37 and 39, link 36, and detent 35, to the position shown in Fig. 10, where the arm 39 holds release shaft 42 in its idle position as cam 88 (Fig. 14) moves away from roller 89a at the very end of the operation.

Device for locking and releasing the transaction and the motor keys

In order to enforce proper operation of the machine in connection with the different sorts of posting, there is provided a device set forth hereinafter, for locking and releasing the transaction and motor keys.

General description of the arrangement

The detent 300 (Figs. 15, 15a, 16, 18, 24, 25, 26, 27, 28, 29, 30, and 31) is movably mounted on two stationary pins 303, 304 mounted on the key frame, said pins engaging in slots 301, 302 of the detent 300. The said detent is under the action of a spring 305 (Figs. 24, 25, 26, 27, 28, and 29) urged to bring the upper ends of the slots in contact with the studs 303, 304 when the detent is in normal position as shown in Fig. 24. A pin 306 carried by the key frame has pivoted thereon a two-armed pawl 307, the nose 309 formed on one arm of said pawl normally engaging, under the action of the spring 308, the back side of the detent and, when the detent is in moved position, the nose 309 drops into locking notches 310, 311 provided on the back of the detent, to arrest the detent in those moved positions against the action of spring 305. The other arm 312 of pawl 307 extends into the path of a pin 313 of the arm 314 secured to the shaft 95 supported in the key bank frame, and which shaft is rocked by pitman 64 in the manner hereinbefore described. During the balancing operation, the arm 314 performs a rocking movement corresponding with the depression and release of the blind keys P—NB and N—NB, said movement being utilized for the purpose of disengaging the nose 309 of the pawl 307 from the locking notch and, thus, permitting the detent to return to initial position. The detent 300 is coupled with a second detent 319 by means of a spring 316 stretched between pin 315 on detent 300, and pin 318 on detent 319, extending through the slot 317 of detent 300. Further, the detent 319 is movably mounted on the stationary pins 303, 304 engaging in slots of the detent. The detent 319 can be locked by a pawl 321 pivoted at 306. A spring 322 maintains the nose 323 of the pawl 321 in engagement with the detent 319 and rocks the nose 323 into engagement with notches 324 and 325.

An arm 326 (see also Fig. 24A) of a lever 328, pivoted on a stud 327, is normally in position beneath the stud 329 to control the effectiveness of the pawl 321 during the various operations of the machine. When the first item of a transaction is entered, the lever 327 is moved upwardly, but not far enough to withdraw the arm 326 from beneath the stud 329 and therefore the arm 326 continues to maintain the pawl 321 in ineffective position, as shown in Fig. 25. When the second item of a transaction is entered, the arm 328 is rotated counter-clockwise (Fig. 25) and thereby by-passes the stud 329 on the pawl 321, which movement releases the pawl to the action of its spring 322 and the pawl comes to rest in the notch 325 of slide 319. At the end of the second item-entering operation the arm 328 returns in a clockwise direction into the position shown in Fig. 26, and in this position the stud 329 is beneath the arm 326, the arm 326 having been arrested in an intermediate position by means later described. When the sub-total key is later depressed in the manner later described, the pawl 321 is rocked clockwise (Fig. 26) around its pivot 306. This movement of pawl 321 withdraws the stud 329 from beneath the arm 326, such movement being possible without disturbing the arm 326 because the pivot point 307 is located in relation to arm 326 to cause the stud 329 to scribe an arc away from the end of arm 326. The said second movement of lever 328 is effected by depressing a transaction key, which, when depressed, strikes yielding noses 332 on the upper end of lever 328. The noses 332 are yieldingly mounted on extension 330 of the lever 328 to permit the studs on the transaction keys to by-pass them under certain conditions, as hereinafter described.

The pawl 321 is released by the sub-total key, as just described, by the following mechanism. A pin 334 of the slide 319 carries pivotally a two-armed lever 335, one arm thereof extending into the path of a pin 523. The pin 523 is fastened to the end of arm 338 of a two-armed bail 339 mounted on shaft 391. The other arm 340 (Fig. 31) of the bail 339 is within the reach of the motor key bank and has a longitudinal slot 341 engaged by the pin 423 of the sub-total-taking key 424. When, therefore, the sub-total key is operated, the lever 335 is rocked out and its other arm catches the pin 329 of the pawl 321, lifts the pawl 321 against the action of the spring 322, and thus releases the slide 319. In rest position, the lever 335, under the action of a spring 342, bears on the pin 344.

To control the depression of the motor keys, the motor key bank is provided with an auxiliary detent 345 (Fig. 31) movable on stationary pins 207 and 203 on the key bank frame, said pins engaging slots 348, 349 in said detent. A movement of the detent 300 is transmitted to the detent 345 by means of a rod 353 (Fig. 24A) pivotally carried by the pin 350 of the lever 328 and an arm 351 (Fig. 24) fixed to the sleeve 352 rotatably mounted on shaft 391 as well as by a suitable arm 354 (Fig. 31) and the link 355 co-operating with the motor key bank. To this end, a pin 356 on the link 355 extends into an aperture 357 of the detent 345. In normal position, the pin 356 engages a section 358 of the said aperture. At the ends of a second tube 359 fitted on shaft 391, there are secured the arms 360, 361 (Figs. 24 and 31) carrying pins 362 and 363 engaging elongated slots 364, 365 in the links 353 and 355 and to convert a rotary movement (to be later described) of the two-armed lever 328 into a to-and-fro motion of the detent 345 when the pin 356 leaves the recess 358 and co-operates with the inclined surface 366 of the aperture 357.

*Operation of the locking device: normal position*

In normal position (Figs. 15a, 24, 29, 30, 31, 32) the locking surface 367 of the detent 300 and radial recesses 369 of the detent 319 are under the pins 85 of the "Old Balance" keys. Bevelled surfaces 371 of the detent 300, and bevelled surfaces 373 of the detent 319 are in the path of the pins 390 of the transaction keys. The sub-total-taking key is locked, as the locking surface 375 of the detent 300 is in the path of the pin 523.

The pawl 307 is disengaged from notches 310 and 311 of the detent 300. The position of the detent 319 is determined by the uppermost position the pin 318 may assume within the slot 317. Also it is determined by the nose 323 of the pawl 321 engaging the recess 325 of the detent 319.

The motor key 24 cannot be depressed, as the locking surface 376 of the detent 345 of the motor key bank lies in the path of the pin 23 (Figs. 31 and 37).

Thus, in normal position, only the two transaction keys "D" and "W" are free to be operated for entering deposits or withdrawals affecting the Balance.

*Entering the first transaction amount*

Upon depressing the "D" or "W" key, the detent 300, against the action of the spring 305, is moved one step out of its rest position and locked at once by means of the nose 309 of the pawl 307 engaging the recess 310, as illustrated in Fig. 25. When this occurs, the bevelled surfaces 371 of the said detent are positioned under the pins 85 of the keys P—OB and N—OB. At the same time, the locking surface 375 has been moved out of the path of the pin 523 to release the sub-total motor bar 424.

Also the detent 319 has been moved one step; in opposite direction, however, in conformity with the shape of the bevelled surface 373. At this time its locking surfaces 379 are moved beneath the pins 85 of the Old balance keys. The detent 300, when moved, causes, through the parts 328, 350, 353, 351 (Figs. 24, 24A, and 25), 352, 354, 355, and 356 (Fig. 31), the detent 345 to be moved out of its normal position, the pin 356 remaining within the recess 358 of the aperture 357. At this time, the locking surface 382 is moved under the pin 423 of the motor key 424, while the locking surface 376 is moved out of the path of the pin 23 of the motor key 24.

When the "Deposit" or "Withdrawal" key is depressed, all the other keys are held locked, except the motor key 24.

After releasing the depressed transaction key, the detent 300 remains in its new position (Fig. 25). The detent 319, however, under the action of a spring, is restored to normal position, where it is held by the pawl 321 against the action of the spring 316. This back movement is rendered possible by the fact that the arm 326 of the lever 328 remains under the pin 329 of the pawl 321, thereby preventing the nose 323 of the pawl from entering the notch 324. Due to the detent 319 returning to normal position, its locking surfaces 379 are moved out of the way of the keys P—OB and N—OB.

When the depressed key "D" or "W" is restored to its undepressed position, the stud thereon by-passes the yielding nose 332. After the key pin has by-passed the nose 332, a flange 383 (Fig. 30) thereon engages immediately again the projection 330 of the lever 328. The detent 345 remains in its new position, so that the sub-total-taking key 424 is held locked and the motor key 24 continues to be free.

Thus, after the first transaction is entered, it is possible to post additional transactions or the Old balance (Fig. 25).

Entering the Old balance after only a single transaction is entered

If only one transaction has to be entered, the Old balance is entered subsequently. By depressing one of the "Old balance" keys, the detent 300 is moved upward by a further step and held in its new position by means of the nose 309 engaging the notch 311. At this time, the locking surfaces 385 are positioned under the pins 390 of the transaction keys. The detent 319, having been held by the pawl 321, has not altered its position, while the detent 345 took part in the movement of the detent 300, and the pin 356 of the link 355 did not leave recess 358. The locking surface 382 is long enough to remain in the path of the pin 423 of the motor key 424, and, therefore, the sub-total motor key 424 remains locked. However, the motor key 24 is free to be depressed because the locking surface 376 is now two steps beyond the stud 23.

During the machine operation effected automatically following the entry of the Old balance, the arm 314, as mentioned before, performs a to-and-fro movement while the blind keys for the New balance are automatically operated. During this to-and-fro movement of said arm, pin 313 presses upon arm 312 of the pawl lever 307, thereby moving the nose 309 out of the notch 311, so that the detent 300 and, in connection therewith, the detent 345 can be restored to normal position by means of springs.

Entering two or more transactions

After the first transaction has been posted, the transaction keys, as before mentioned, are free for further operation. Now, if a transaction key is depressed again, the detent 300 is not moved, while the detent 319 is moved downward by one unit as is the case in connection with entering the first transaction. Through the noses 332 having been moved into the path of the transaction key pins 390, the lever 328 is given a counter-clockwise rotation (Fig. 25) which causes the arm 326 to by-pass the pawl 321 and to thereby be withdrawn from beneath the pin 329 of the pawl 321, so that the nose 323 of said pawl is then free to enter the notch 324 of detent 319 to hold the said detent in adjusted position. In the new position of the detent 319, its locking surfaces 379 lock the "Old balance" keys. The counter-clockwise rotation of the lever 328 is transmitted, as set forth before, through the links 353 and 355 and the arms 360, 361 and the sleeve 359, to the auxiliary detent 345. At this time the pin 356 leaves the notch 358 and engages section 387 of the aperture 357. However, the section 387 of the aperture 357 is so formed that the detent 345 does not move immediately, but rather is held in the position shown in Fig. 31. With the transaction key depressed, the sub-total-taking key 424 is held locked by bar 345 and only the motor key 24 is depressible.

During the release movement of the transaction key, the lever 328, under the action of a spring, is restored partially and into the position shown in Fig. 26, the detent 345, under the action of its spring 388, being returned at that time to normal position and pin 356 to section 389 of the aperture 357 (Fig. 31). The location of pin 356 in aperture 389 determines the partially-restored position of the lever 328.

When the machine comes to rest after a second transaction is entered, the parts are in the Fig. 26 position, and either the sub-total may be taken with the motor key 424, or more transactions may be entered. However, the "Old balance" keys and the motor key 24 are held locked.

During additional entries, the detents 300 and 319 are not moved. Only detent 345 of the motor key bank is moved to and fro by lever 328 and the connections to the detent 345, according to whether the transaction keys are released or depressed, respectively, in order to lock and release, alternately, the motor keys 424 and 24, in such a way that the motor key 24 is free only when the transaction key is depressed.

Taking a sub-total

After all the items of the transaction have been entered, the total of these items can be taken. To this end, the motor key 424 is depressed, and, with the aid of parts 423, 341, 340, 339, 338, and 523, the lever 335 is given a counter-clockwise rotation, one arm of said lever raising pin 329 of the pawl 321, thus lifting nose 323 out of the notch 324 (Fig. 27). At this time the end of arm 326 is out of the path of travel of the stud 329. Under the action of spring 316, the detent 319 moves upward by two steps, till the pin 318 is positioned uppermost in slot 317 (see Fig. 28). By this movement, the locking surfaces 392 are moved into the reach of the transaction key pins 390, while the locking surfaces 379 are moved out of the reach of the "Old balance" keys. Taking the sub-total does not affect detent 345 and therefore the motor key 24 is still held locked.

After this machine operation is completed (see Fig. 23), it is not possible to depress the keys "D" or "W" to enter other transactions, and the only operation that can be performed is the entry of the Old balance.

*Entering the "Old balance"*

By depressing one of the "Old balance" keys, the detent 300 is moved upwardly a second step and is locked by means of the nose 309 of the pawl engaging the notch 311. At this time, the locking surfaces 385 are positioned under the pins of the transaction keys.

Also detent 345 has been moved along by one step, with the pin 356 lying in the section 389 of the aperture 357, to thereby withdraw the shoulder 376 from beneath the stud 23 of the motor key 24.

During the following machine operation, as described above, the arm 314 is rocked and releases the detent 300, and thus permits the latter, and the detent 319 connected thereto by the pin 318 and slot 317, to be restored to normal positions.

Also the parts cooperating with the motor key bank are returned to normal position. Pin 356 of the link 355, after the link 355 has been positioned wherein the uppermost terminal of the slots 348 and 349 contact the pins 207 and 208, is moved opposite the notch 358 to drop in under the action of the spring of the lever 328 through the medium of parts 350, 352, 353, 360, 359, 361, 363, and 355. Thus, at the end of the complete posting action, all keys are locked except the transaction keys.

*Operation: entering the first item of a transaction*

When a posting operation is started, in addition to the amount keys, only the transaction keys "D" and "W" are depressible, while the "Old balance" keys are held locked by the locking surfaces 361 of the detent 300. The motor keys 424 and 24 are held locked by the locking surfaces 375 and 376 of the detents 300 and 345 respectively. Thus, each entry has to be opened up with the posting of an item.

Upon depressing a transaction key, the detents 300 and 319 are moved upward and downward respectively, whereby the locking surfaces 361 of the detent 300 are disengaged from the "Old balance" keys, but, at the same time, the "Old balance" keys are again locked by the surfaces 379 of detent 319. By the parts 350 to 356, the upward movement of the detent 300 is transmitted to the detent 345. The surface 382 of said detent 345 now locks the sub-total-taking motor key 424 while its surface 376 releases the motor key 24.

Depression of the "D" or "W" key moves the slide 10 (Fig. 15A) up or down to engage either lever 17 or 18 (Fig. 11) with one of the blind keys in the motor key bank, so that upon depression of the motor key 24, slide 206 (Fig. 10) will be moved up or down to select the proper side of the Balance totalizer. Depression of the motor bar lowers slide 35 and releases the machine by removing shoulder 259 from block 40a. Since the timing mechanism for engaging the Balance totalizer (Fig. 11) is at this time in normal or adding position, the Balance totalizer will be engaged with the amount differentials when they have completed their initial movement, and will be disengaged when they have completed their return movement. During this operation, the automatic cycle cams perform no function, since roller 64a (Fig. 12) lies in the concentric groove 65a during the entire operation. Near the end of the cycle, cam 88 (Fig. 14) engages roller 89a and rotates arm 89 to rotate release shaft 42 and remove block 40a (Fig. 10) from under shoulder 259 to allow the shoulder to fall back into its normal position.

When, at the end of this machine operation, the transaction key is released, the pawl 307 holds detent 300 in its moved position, whereas detent 319 returns to normal position, since pawl 321 was prevented from entering the notch 324 by means of the arm 326 of the lever 328. In this position, both the detent 300 and the detent 319 free the transaction keys and the "Old balance" keys as well, so that either the Old balance or another item of the transaction may be entered.

*Entering additional transactions*

When, in order to enter another item of the transaction, one of the keys "D" or "W" is depressed, detent 300 is not moved, while detent 319 is moved by one step downwardly as is the case in connection with the first transaction dealt with. In this position, said detent is held by pawl 321. The extensions 379 of the detent 319 lock, at this time, the "Old balance" keys, while the extension 375 of detent 300 releases the sub-total-taking key 424 which, however, remains locked by extension 382 of detent 345, since this detent is held in its upper position by the pin 356 in the notch 387. Upon depressing the motor key 24, the only depressible key, the machine is released for an adding operation during which the amount of the transaction is entered on the balancing device either in the positive or negative sense in accordance with whether the amount is a positive or a negative one.

When, at the end of this machine operation, the motor key 24 is released, detent 345 returns to normal position (see Fig. 31), in which it releases the sub-total-taking key 424 and locks the motor key 24. While entering other items of the transaction, the detent 345, upon depressing the transaction key, is moved in such a way that it again releases the motor key 24 and locks the motor key 424. Thus it becomes possible to register as many items of a transaction as required, but only the motor key 24 can be operated to release the machine for this purpose.

*Taking the sub-total of a plurality of transactions*

After all items which are to be posted on a certain account are entered, the total thereof is taken, which can only be effected by operating the motor key 424. In accordance with whether a positive or negative balance is standing on the Balance totalizer, this motor key, by means of the detent 416, is coupled either with the plus key 420 or with the minus key 422, so that, upon depressing said key, the plus or minus side of the Balance totalizer is selected by detent 206. Moreover, by depressing the motor key 424 and by means of the detent 408, the bevel gears 403, 402, and 401, the drum 62, the disk 426, and the pinion 31, 245, the mode of operation of the Balance totalizer is conditioned to sub-total-taking, and then the machine is released for operation, during which operation the sub-total will be printed.

Pin 523 on arm 338 connected to motor key 424 releases the pawls 335, 321, so that detent 319 can be positioned as shown in Fig. 27, in which position it releases the "Old balance" keys, while its extensions 392 lock the transaction keys, so that the only possible operation that can be performed after the sub-total is taken is the entry of the Old balance.

*Entry of Old balance, taking New balance, and transfer of New balance to another totalizer*

After the operator has completed the entry of a single deposit or withdrawal, or after the entry of a plurality of deposits and withdrawals the operator has taken the intermediate, or sub-total, from the Balance totalizer, he enters the Old balance by depressing the appropriate amount keys together with the proper Old balance key and the motor key 24. By depression of the key P—OB or N—OB, the detent 300 is moved upward by a further step and locked by the pawl 307, at which time said detent carries along detent 345 through the medium of parts 328, 350—356, so that the locking surface 382 locks the motor bar 424, while locking surface 376 releases the motor key 24.

Depresssion of the Old balance key moves slide 10 (Fig. 15) up or down to cause the proper side of the Balance totalizer to be engaged for the entry of the Old balance, as in a normal adding operation. Depression of this key also moves slide 84 down, and thereby rotates segment 76 to move the disk assembly of the automatic cycle mechanism to the right (Figs. 15 and 17). This engages disk 66 with roller 64b (Fig. 15). Now, upon operation of the machine, the Old balance is added in the Balance totalizer as in normal adding operations, but, since the segment 105 (Fig. 14) is situated in line with one of the Old balance keys, the drum 109 has shifted cam 88 so that the release shaft 42 is not restored at the end of the cycle. During the latter part of this first cycle, the key release shaft 81 operates in the usual manner to release the depressed keys.

Near the end of the first cycle of operation, the cam groove 66d (Fig. 13) moves pitman 64 to the right to shift the timing mechanism 31, 245 for engaging the Balance totalizer by rotation of pinions 481 and drum 62 (Figs. 11, 15, and 17). Movement of the pitman 64 also raises link 93a (Fig. 12) to depress whichever one of the New balance keys is at this time engaged with the stud 96, the selective engagement of these keys depending upon the overdraft mechanism (Fig. 9) of the Balance totalizer. This depression of one of the New balance keys moves slides 10 (Fig. 15) up or down so as to have the proper side of the Balance totalizer engaged for the second cycle. Movement of the pitman 64 also moves stud 117a (Fig. 11) into the path of shoulder 118 so that the stud 23ª of the motor bar may be automatically depressed at the very beginning of the second cycle. This depression of the stud 23a controls the engagement of the proper side of the Balance totalizer through the slide 206 as in normal adding operations. When the blind key for the New balance is operated, the angular lever 94 carries along arm 314, the pin 313 of which releases at this time pawl 307, so that detents 300 and 319 may return to normal positions in which they release the transaction keys only.

As hereinbefore described, the motor key 24 is released by the operation of shaft 81 near the end of the first cycle of operation, and then when shaft 95 is rocked, the detents 300 and 345 are released, thus allowing the shoulder 376 to move under the stud 23. Under such conditions, it is impossible to depress the motor key 24 and stud 23 at the beginning of the automatic cycle to properly adjust control bar 206 and operate arm 17 or 18. For this reason, the hereinbefore described stud 23a is provided, secured to the block 582, which block can be lowered without lowering the key 24 or stud 23. It is not necessary to lower stud 23 to actuate detent 35 at the beginning of the automatic cycle of operation, because the arm 39 (Fig. 10) has not been restored at this time, and therefore maintains the machine in condition to perform another cycle automatically. Thus, when bell crank 115 (see also Fig. 37) is operated, the stud 23a actuates whichever arm 17 or 18 is connected thereto and also shifts detent 206 to select the proper side of the Balance totalizer, and the stud 23 does not move.

During the first part of the second cycle, the New balance is taken from the Balance totalizer by the initial movement of the differential mechanism, and during the last part of this cycle, the cleared amount is entered on the totalizer selected by the depressed New balance key in the transaction bank, this entering taking place during the return movement of the amount differentials, as is customary in the art. The "New balance" totalizer (Figs. 20 and 21) is engaged with and disengaged from the actuators at the proper time to receive this amount, since the timing mechanism for this totalizer is controlled by the lever 141 (Fig. 17) which remains in its adding position during this entire operation.

Depression of one of the New balance keys raises slide 122 (Figs. 14 and 15) to couple link 124 with lever 127 so that, upon operation of the key release shaft 81, lever 90 (Fig. 12) is oscillated to allow the automatic cycle disk assembly to return to its left-hand position (Fig. 17) where cam groove 65d (Fig. 12) engages roller 64a to return pitman 64 to its left-hand position during the remainder of the operation of the machine. This shifting of pitman 64 returns the timing mechanism for the Balance totalizer to its adding position and allows the depressed New balance key to return from its depressed position. The return of the pitman also allows stud 117a (Fig. 11) to return to its normal position.

During the second cycle, the segment 105 (Fig. 14) is moved from its position opposite an Old balance key to a position opposite one of the New balance keys. This rotates drum 109 to replace cam 88 in the plane of roller 89a to stop the machine at the end of this cycle. When the posting is completed, all the keys are locked again, except the transaction keys.

*General description of the modification arrangement*

Figs. 33 and 34 show a modification of the key locking device described hereinafter.

A detent 500 (Fig. 33) has slots 501, 502 guided on two stationary pins 303 and 304 of the transaction key bank. The said detent is provided with inclined slots 505, 506, 507, a bevelled surface 508, and locking surfaces 509, 510, 511, and 512, which cooperate with the "Old balance" keys. Further, said detent is provided with radially arranged slots 513, 514, bevelled surfaces 515, and locking surfaces 517, 518, which cooperate with the transaction keys. Pivoted on a stationary pin 519 of the key frame is a two-armed lever 520, the surface 521 of one arm of which lies in the path of the pins 390 of the transaction keys. When said lever is in normal position, a hook 522 thereof prevents a lever 503 from being moved. The latter is pivoted on a pin 524 of the key bank frame and is able, after being released, to rock clockwise under the action of a spring 525 till it strikes pin 303. While rocking, its surface 526 strikes a stationary pin 527 on detent 500, the latter being moved thereby out of its rest position.

Detent 500 is not held by a spring, but is held in its respective positions by means of a pawl 530 engaging notches 531 in the inner side of the detent 500, said pawl being pivoted on pin 528 and actuated by a feeble spring 529.

By means of the arms 532, 533 secured to the sleeve 534 rotatable on shaft 391, the pin 423 of the sub-total key 424 is connected to the pin 523, which can be locked by the surface 536 of detent 500. On the other hand, said pin 523 may move the detent 500 one step, due to the cooperation of said pin with the cam surface 537 of detent 500. The key pin 423 guided in a slot 538 of the arm 533 can be arrested by the surface 539 of a detent 544 guided on pins 207, 208 of the motor key bank, said pins extending through slots 542, 543. The motor key pin 23 can be locked by the surface 545 of said detent.

The shaft 391 carries a further sleeve 546 having secured thereto an arm 547 extending into the path of the transaction key pins 390. When one of these keys is operated and released, the arm 547 is rocked, which rocking movement is transmitted by the second arm 548 of the sleeve 546 to detent 544 acted upon by spring 549 to give a reciprocating motion by means of pin 550 of the arm 548 cooperating with the cam surface 551 of detent 544.

Upon depressing and releasing the keys P—OB and N—OB, the detent 544 performs a similar reciprocating movement. This is due to the fact that the one rigid arm 552 of the two-armed bail 553 rotatable on shaft 81 extends into the path of the key pins 85. The rocking movement of said arm is transmitted to detent 544 by means of the second rigid arm 554 cooperating with the cam surface 556 of the detent.

Detent 500 is returned by the arm 557 and stud 558 thereon, due to the rocking movement of shaft 95, in the same manner described for rocking shaft 95 and arm 314 of the first form described herein. In rocking arm 557, the stud 558 coacts with the cam surface 559 of the detent 500 to restore it to its home position.

Operation of the arrangement during posting operations

To facilitate surveying the positions of the detent 500 and its locking functions in the course of a posting action, the relative positions of the key pins 390 and 85 and the pins 523 and 558 as well, are indicated by small numbered circles with dashed circumferential lines (see Fig. 33).

Normal position

In normal position, referred to by "1" (Fig. 33), the radial slots 513 and 514 of detent 500 are positioned under the pins 390 of the transaction keys and the locking surfaces 509 and 510 under the pins 85 of the "Old balance" keys. The motor key 424 is locked, for the surface 536 of the detent 500 is in the path of the pin 523. Also the motor key 24 is locked temporarily by the surface 545 of detent 544, as shown in Fig. 34.

Thus, in normal position only the transaction keys are free to permit the entering of deposits or withdrawals.

Entering the first transaction amount

If one of the two transaction keys is depressed the first time, detent 500 does not leave its normal position at once. The downward movement of the pins 390 gives the lever 520 a counter-clockwise motion whereby the nose 522 is moved out of the path of the lever 503. Under the action of spring 525, the lever 503 rocks clockwise and its surface 526 engages the stationary pin 527 of detent 500. When the respective pin 390 moves upward, a spring 560 urges the nose 522 of the lever 520 towards the surface 561 of the lever 503. After the key pin 390 has left the radial slot 513 or 514, the detent 500 becomes free to move and is carried along by the pin 527 till lever 503 strikes its stop 303. At this time, detent 500 is in the position referred to by numeral "2."

By the downward movement of the pin 390, the arm 547 is rocked clockwise, and by means of the arm 548 moving in the same direction, the detent 544 is moved out of its normal position against the action of its spring 549, at which time the motor key pin 423 is locked and the motor key pin 23 is released. After the machine operation is completed, the motor key 24 is locked again, due to the detent 544 having been returned to normal position by means of spring 549.

In its new position referred to by numeral "2," surface 536 of detent 500 is in position to lock motor key 424. Now, the cam surfaces 515 and the inclined slots 505, 506 are positioned under the transaction keys and the "Old balance" keys respectively.

After the first transaction is posted, it is possible to post either other transactions or the old balance.

Entering the old balance after posting a single transaction only

If, after the first transaction, an Old balance key is depressed to enter the Old balance detent 500 is positioned as indicated by the numeral "3," due to the arrangement of the inclined slots 505, 506. At the same time, the arm 552 of the bail 553, rotatable on shaft 81, is rotated in counter-clockwise direction and, by means of the parts 554, 555, and 556, detent 544 moves out of its rest position for the purpose of releasing the motor key 24 and locking the sub-total-taking key 424.

After releasing the key P—OB and N—OB, respectively, detent 500 is returned to its normal position by reason of the rocking movement of the arm 557 which occurs concurrently with the operation of the respective blind key P—NB and N—NB. The cam surface 559 of the detent 500 is so formed that the pin 558 (in the "2" position) comes into contact with the lower section thereof only at the end of its movement to effect the required one-step back movement; that is, out of position "2" into position "1."

When the key P—OB or N—OB, respectively, is released, detent 544 is able to return to normal position. When the detent 500 is restored to normal position, the arm 503 is restored to normal position, wherein it is latched by the nose 522 of pawl 521. The restoring movement of arm 503 is obtained by any desired means.

Entering a second transaction and subsequent transactions

If a second transaction is posted, detent 500 is moved into position "3," due to the cam surface 515 positioned under the key pins 390, in which position said detent remains till after the sub-total is taken. In this position, pin 523 is not locked again, but the "Old balance" keys are locked by the surfaces 511, 512. With the transaction key depressed, detent 544 releases motor key 24 and locks the sub-total-taking key 424 as set forth already in connection with the first transaction.

The sub-total can be taken only after the second transaction is entered. If, beforehand, other transactions are to be posted, detent 544 moves to and fro according to whether the transaction key is depressed or released, in order to lock or release alternately motor keys 24 and 424 in such a way that the motor key 24 is released when the transaction key is depressed.

*Taking the sub-total*

After all transactions have been posted, the sub-total can be taken. Cooperating with the cam surface 537, pin 523 moves detent 500 by one part-step into position "4." While positioned at "4," the transaction keys are locked by surface 517, 518; the "Old balance" keys, however, are positioned above the inclined slot 507 and the bevelled surface 508.

Detent 544 of the motor key bank remains in its rest position, so that motor key 24 is held locked while the sub-total is taken.

After the sub-total is taken, no further transactions can be posted, but now only the Old balance can be entered.

*Entering the Old balance*

If any of the "Old balance" keys is operated, detent 500 is temporarily advanced by one step due to the arrangement of the inclined slot 507 and the surface 509. At this time the outer terminal of surface 559 passes beneath the stud 558. Also detent 544 is moved out of its normal position through the medium of parts 552 to 556, thereby releasing the motor key 24.

During the next machine operation, release of the "Old balance" key causes the detent 500 to be positioned, temporarily, at "4," whereupon it is returned to normal position by means of the arm 557, which is rocked when the selected blind key P—NB or N—NB is operated. At this time the pin 558 immediately, when commencing its movement, engages the surface 559 so that the necessary back movement by three steps, that is, from position "4" into position "1," is rendered possible.

When the "Old balance" key is released, detent 544 returns also to normal position and the lever 520 is into effective locking position. Thus, at the end of the whole posting operation, all parts of the arrangement are restored to normal position.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:

1. In a machine of the class described, the combination of machine release keys; means to normally lock one of the machine release keys against depression; transaction keys; a control bar operable upon depression of a transaction key; a latch to maintain the control bar in the position to which it is moved upon depression of a transaction key; means pivoted on said control bar; devices on the pivoted means movable into the path of the transaction keys when the control bar is moved, said devices remaining in the path of the control keys when the control bar is held by the latch, whereby the pivoted member is actuated upon subsequent depression of a transaction key; and connections between the pivoted means and the first-named means to determine the position of the first-named means.

2. In a machine of the class described, the combination of machine release keys; means to normally lock one of the machine release keys against depression; transaction keys; a control bar operable upon depression of a transaction key; a latch to maintain the control bar in the position to which it is moved upon depression of a transaction key; means pivoted on said control bar; devices on the pivoted means movable into the path of the transaction keys when the control bar is moved, said devices remaining in the path of the transaction keys when the control bar is held by the latch, whereby the pivoted member is actuated upon subsequent depression of a transaction key; connections between the pivoted means and the first-named means to determine the position of the first-named means; manipulative devices to control the machine for entering old balances; a mechanism rendered effective under control of the manipulative devices to cause the machine to perform a balancing operation immediately following an old balance entry operation; and means actuated by said mechanism to actuate the latch to thereby release the control bar during a balancing operation.

3. In a machine of the class described, having a totalizer, the combination of transaction keys; a plurality of normally locked machine release keys; a control bar moved by the depression of the transaction keys to unlock one of the release keys, said bar in normal position locking one of said machine release keys and when in moved position unlocking said one machine release key; a latch to hold the bar in moved position after data has been entered into the totalizer; a member connected to the control bar and moved by the depression of a transaction key; and connections operated by the member to lock said one machine release key upon depression of a transaction key after data has been entered into the totalizer during the next preceding operation of the machine.

4. In a machine of the class described having a totalizer, the combination of means to enter items into the totalizer; a sub-total key to control the machine for sub-total operations; means to normally lock the sub-total key against operation; a release key to release the machine for operations; locking means associated with both keys to normally lock the release key against operation but normally ineffective to lock the sub-total key; classification keys for classifying the items entered; means under control of the classification keys to move the second-named locking means into a position to release the release key for operation for entering the first item of a transaction into the totalizer and to simultaneously lock the sub-total key; and means actuated by the classification keys to move the second-named locking means into another position to release the sub-total key for operation after an item in addition to said first item has been entered into the totalizer and to simultaneously lock the release key after the second item has been entered.

5. In a machine of the class described having a totalizer, the combination of means to enter items into the totalizer; a sub-total key to control the machine for sub-total operations; means to normally lock the sub-total key against operation; a release key to release the machine for operations; locking means associated with both keys to normally lock the release key but normally ineffective to lock the sub-total key; classification keys for classifying the items entered; means operated upon operating either of the classification keys to move the second-named locking means into a position to release the release key for operation for entering the first item of a transaction into the totalizer and to simultaneously lock the sub-total key; means actuated by the classification control keys to move the second-named locking means into a position to release the sub-total key for operation after an item in addition to said first item has been entered into the totalizer and to simultaneously lock the release key after the second item has been entered; and means actuated upon operation of the sub-total control key to release the release key, whereby a reset operation can be initiated only after a sub-total operation of two or more items.

6. In a machine of the class described, the combination of a plurality of transaction keys; a plurality of machine release keys; a plurality of locking means, one for each release key, to normally lock each of said release keys; one of said locking means operable by the depression of a transaction key to unlock its associated machine release key; and means also operable upon depression of said transaction key to operate the other locking means to unlock its associated release key and to lock the unlocked release key.

7. In a machine of the class described, the combination of a plurality of transaction keys; a plurality of machine release keys; a plurality of locking means, one for each release key, to normally lock each of said release keys; means operable by the depression of a transaction key when preparing the machine for entering a single item to operate the locking means for a certain one of said machine release keys to unlock a certain machine release key for entering a single item; and means operable by a depression of a transaction key when preparing the machine for entering a second item to control said locking means to lock said certain machine release key and to unlock another machine release key at the end of the second item entry operation.

8. In a machine of the class described, the combination of a plurality of transaction keys; a plurality of machine release keys; a plurality of locking means, one for each release key, to normally lock each of said release keys; means operable upon depression of a transaction key for entering a single item to operate the locking means for a certain one of said machine release keys to unlock a certain machine release key for entering a single item; and means operable by a depression of a transaction key for entering a second item to control said locking means to lock said certain machine release key and to unlock another machine release key at the end of the second item entering operation and operable by the depression of a transaction key for subsequent item entry operations to control said machine release key locking means to again unlock said certain machine release key and to lock the other machine release key.

9. In a machine of the class described having a totalizer, the combination of transaction keys; a plurality of normally locked machine release keys; a control bar moved by the depression of the transaction keys to unlock one of the release keys, said bar in normal position locking one of said machine release keys and when in moved position unlocking said one machine release key; a latch to hold the bar in moved position after data has been entered into the totalizer; a member connected to the control bar and moved by the depression of a transaction key; connections operated by the member to lock said one machine release key upon depression of a transaction key after data has been entered into the totalizer during the next preceding operation of the machine; a manipulative device; means set in motion under control of the manipulative device to actuate the latch to thereby release the control bar; and means to restore the control bar to normal position after being released by the operation of the latch.

10. In a machine of the class described having a totalizer, the combination of transaction manipulative devices; control means to release the machine for sub-total operations; control means to release the machine for entry and reset operations; means to normally lock each of said control means against operation; a control bar settable into one position of adjustment out of normal position by the depression of any of the transaction manipulative devices; a latch to hold the control bar in adjusted position at the end of the machine operation; manipulative control devices to control the machine for old balance entries and a balance operation in continuous operations, said last-named manipulative control devices provided with projections to engage the control bar to move it from said one position of adjustment into a second position of adjustment wherein the control bar locks the transaction manipulative control devices against operation; and means connected to the locking means and actuated by the control bar to release the second-named control means for operation whenever the control bar is moved into either of its two adjusted positions.

11. In a machine of the class described having a totalizer, the combination of transaction control devices; a sub-total control means; a control bar adjustable from normal position into a moved position when entering the first item of a series of items; means to maintain the control bar in said moved position; locking means connected to the control bar and movable therewith to lock the sub-total control means when the control bar is in said moved position; means on the control bar in the path of the transaction control devices when the control bar is in said moved position; and means operable by a transaction control device when a transaction control device is depressed for a subsequent data entry operation and operated through said means on the control bar to readjust said locking means to unlock the sub-total control device, whereby a sub-total operation can be initiated only after more than one item has been entered into the totalizer.

12. In a machine of the class described having a totalizer, the combination of transaction control devices; a sub-total control means to release the machine for operation when taking a sub-total; a machine release device to release the machine for data entry operations and for reset-total operations; a locking bar to normally lock each machine release device against operation; a control bar operated by the transaction control device to unlock the sub-total control means; and connections between the control bar and the locking bar to control the position of the locking bar to unlock the machine release device to simultaneously lock the sub-total control means upon depression of a transaction control device, and to lock the machine release device when no transaction control device is depressed.

13. In a machine of the class described having a totalizer, the combination of classification control devices; a sub-total control device; a locking means; a machine release device normally locked against depression by said locking means; means operated by the classification control devices when operated for entering the first item of a transaction to move said locking means into a position to release the machine release device and to lock the sub-total control device; a latch to latch the last-named means in operated position; and mechanism set by the classification control devices during the entry of the second item of a series of item entry operations to readjust the locking means to release the sub-total control device for operation, said mechanism thereafter actuated by the classification control devices to position the locking means to lock the sub-total control means and unlock the machine release device upon operation of a classification control device, whereby the sub-total control device is locked when a classification control device is operated and the machine release device is locked when no classification control device is operated.

14. In a machine of the class described having a totalizer, the combination of classification control devices; a sub-total control device; a locking means; a machine release manipulative device normally locked against manipulation by said locking means; balance control devices to control the machine for entering a balance; mechanism rendered effective by the balance control devices to automatically reset the totalizer following a balance entry operation; a control bar settable by the classification control devices when entering a second item of a series of items to lock the balance control devices against operation; and connections settable by the classification control devices when preparing the machine for entering the second item of a series of items to control the locking means for subsequent operation to lock the machine release device against operation and to unlock the sub-total control device when no classification control device is operated, whereby only the sub-total control device and the classification control devices are operable after a second item of a series of items has been entered, said connections operable by the depression of a classification control device for said subsequent operations to lock the sub-total control device and to unlock the machine release manipulative device.

15. In a machine of the class described, the combination of a plurality of machine release keys; means to normally lock one of said machine release keys against operation; transaction keys; a control bar movable from a normal position to an adjusted position by the operation of a transaction key; means to maintain the control bar in its adjusted position after the operated transaction key is restored to normal position; an interponent between the control bar and another one of said machine release keys coacting with the control bar when the control bar is in normal position to prevent operation of the said other machine release key, said interponent being unaffected by the control bar when the control bar is in the adjusted position after the transaction key is restored to normal position; and connections between the control bar and the first-named means to shift the first-named means into an ineffective position in relation to the said one of said machine release keys and into an effective position in relation to the other machine release key to unlock said one machine release key and lock the other machine release key whenever a transaction key is in operated position.

ERNST BREITLING.
HANS SCHWENK.
HANS UHLMANN.